US009690462B2

(12) United States Patent
Kouda et al.

(10) Patent No.: US 9,690,462 B2
(45) Date of Patent: Jun. 27, 2017

(54) INFORMATION TERMINAL, INFORMATION TERMINAL CONTROL METHOD, AND INFORMATION TERMINAL CONTROL PROGRAM

(71) Applicant: Panasonic Corporation, Kadoma-shi, Osaka (JP)

(72) Inventors: Tetsuya Kouda, Osaka (JP); Yasuo Yoshimura, Shiga (JP); Kazuhiro Kuroyama, Osaka (JP); Mariko Nakaso, Shiga (JP); Gantetsu Matsui, Kyoto (JP); Hiromi Toyota, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 364 days.

(21) Appl. No.: 14/379,714

(22) PCT Filed: Dec. 27, 2012

(86) PCT No.: PCT/JP2012/008357
§ 371 (c)(1),
(2) Date: Aug. 19, 2014

(87) PCT Pub. No.: WO2013/128532
PCT Pub. Date: Sep. 6, 2013

(65) Prior Publication Data
US 2015/0019987 A1    Jan. 15, 2015

(30) Foreign Application Priority Data

Mar. 2, 2012  (JP) .................................. 2012-046221
Mar. 9, 2012  (JP) .................................. 2012-052680

(51) Int. Cl.
H05B 6/64    (2006.01)
G06F 3/0484  (2013.01)
(Continued)

(52) U.S. Cl.
CPC ............ *G06F 3/04842* (2013.01); *F24C 7/08* (2013.01); *H04L 67/02* (2013.01); *H05B 6/6438* (2013.01)

(58) Field of Classification Search
CPC ...... G06Q 30/02; G06Q 10/101; G06Q 50/12; G06F 3/04842; G06F 3/167; H05B 6/6435; H05B 6/6438
See application file for complete search history.

(56) References Cited

U.S. PATENT DOCUMENTS 5,317,134 A     5/1994  Edamura
6,949,729 B1 *  9/2005  Ishikawa ................ H05B 6/688
                                                   219/702
(Continued)

FOREIGN PATENT DOCUMENTS

CN     1271829 A    11/2000
CN     1428540 A     7/2003
(Continued)

OTHER PUBLICATIONS

Extended Search Report for corresponding European Application No. 12 869 670.5 dated Nov. 20, 2015, 10 pages.
(Continued)

*Primary Examiner* — Tadeese Hailu
(74) *Attorney, Agent, or Firm* — Brinks Gilson & Lione

(57) ABSTRACT

An information terminal includes a first radio communication unit that performs communication with a server, a condition input unit through which a condition for retrieving a specific cooking recipe information group from cooking recipe information groups stored in the server is input, and a display unit that displays the specific cooking recipe information group specified based on the condition input through the condition input unit. Further, the display unit displays list screen (1200) that displays as a list the specific cooking recipe information group so that first cooking recipe
(Continued)

information that is associated with operation control information is differentiated from second cooking recipe information that is not associated with the operation control information, and a cooking method screen that displays a cooking method relating to specific cooking recipe information in the specific cooking recipe information group displayed on the list screen.

11 Claims, 21 Drawing Sheets

(51) Int. Cl.
    *F24C 7/08*     (2006.01)
    *H04L 29/08*     (2006.01)

(56) References Cited

U.S. PATENT DOCUMENTS

| | | | | |
|---|---|---|---|---|
| 2002/0171674 | A1* | 11/2002 | Paris | G06Q 99/00 715/700 |
| 2003/0121912 | A1 | 7/2003 | Kyung-Hwan et al. | |
| 2003/0141295 | A1* | 7/2003 | Ishikawa | H05B 6/688 219/697 |
| 2003/0187682 | A1* | 10/2003 | Ozawa | H05B 6/688 705/1.1 |
| 2005/0192869 | A1* | 9/2005 | Maeda | G06Q 30/0601 705/26.1 |
| 2009/0078696 | A1 | 3/2009 | Kim et al. | |
| 2009/0287644 | A1* | 11/2009 | Crosby | G06F 17/30522 |
| 2010/0147823 | A1 | 6/2010 | Anderson et al. | |
| 2010/0205047 | A1* | 8/2010 | Khoo | G06Q 30/0207 705/14.1 |
| 2010/0313768 | A1 | 12/2010 | Koether et al. | |
| 2011/0132201 | A1 | 6/2011 | Richardson et al. | |
| 2013/0124662 | A1* | 5/2013 | Yamamoto | G06F 13/00 709/206 |
| 2013/0149679 | A1* | 6/2013 | Tokuda | G09B 19/0092 434/127 |
| 2014/0295382 | A1* | 10/2014 | Ko | G06F 17/30 434/127 |

FOREIGN PATENT DOCUMENTS

| | | |
|---|---|---|
| CN | 1428704 A | 7/2003 |
| CN | 101375106 A | 2/2009 |
| DE | 202 03 117 U1 | 5/2002 |
| JP | H09-049632 A | 2/1997 |
| JP | 2001-343128 A | 12/2001 |
| JP | 2005-037066 A | 2/2005 |
| JP | 2009-008294 A | 1/2009 |
| JP | 2009-097809 A | 5/2009 |
| JP | 2010-192274 A | 9/2010 |

OTHER PUBLICATIONS

International Search Report of PCT Serial No. JP2012/008357 dated Feb. 19, 2013, 2 pages.

* cited by examiner

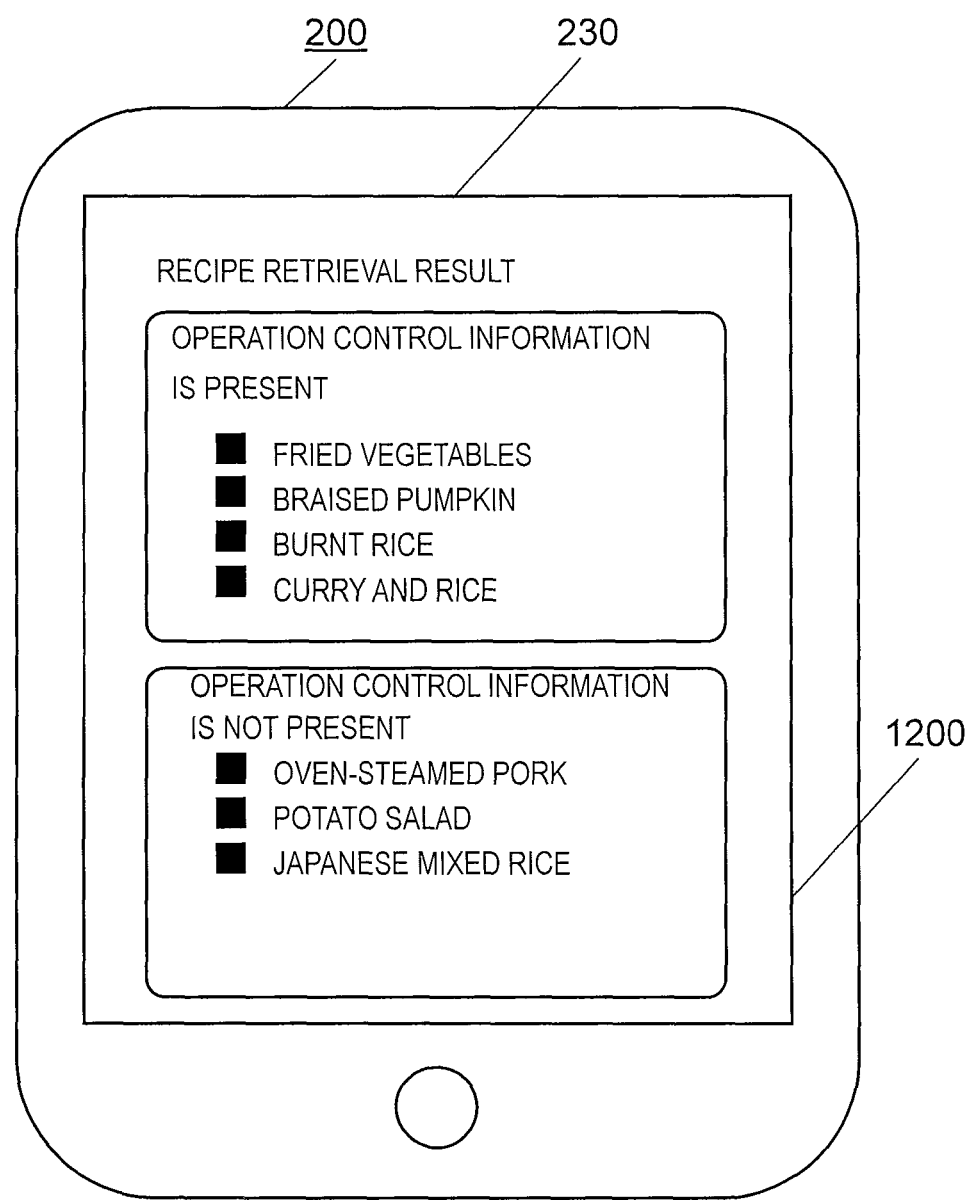

FIG. 10

FIRST DATABASE

| COOKING RECIPE DESIGNATION ID | TITLE INFORMATION | COOKING PROCEDURE INFORMATION | OPERATION CONTROL INFORMATION | ASSOCIATION INFORMATION | TARGET APPARATUS INFORMATION |
|---|---|---|---|---|---|
| X001 | P001 | Q001 | R001 | 1 | E |
| X003 | P003 | Q003 | R002 | 1 | F |
| X003 | P003 | Q003 | R003 | 1 | F |
| X004 | P004 | Q004 | R004 | 1 | E |
| X006 | P006 | Q006 | R005 | 1 | F |
| X009 | P009 | Q009 | R006 | 1 | G |

SECOND DATABASE

| COOKING RECIPE DESIGNATION ID | TITLE INFORMATION | COOKING PROCEDURE INFORMATION | OPERATION CONTROL INFORMATION | ASSOCIATION INFORMATION | TARGET APPARATUS INFORMATION |
|---|---|---|---|---|---|
| X002 | P002 | Q002 | - | 0 | E |
| X005 | P005 | Q005 | - | 0 | G |
| X007 | P007 | Q007 | - | 0 | E |
| X008 | P008 | Q008 | - | 0 | G |

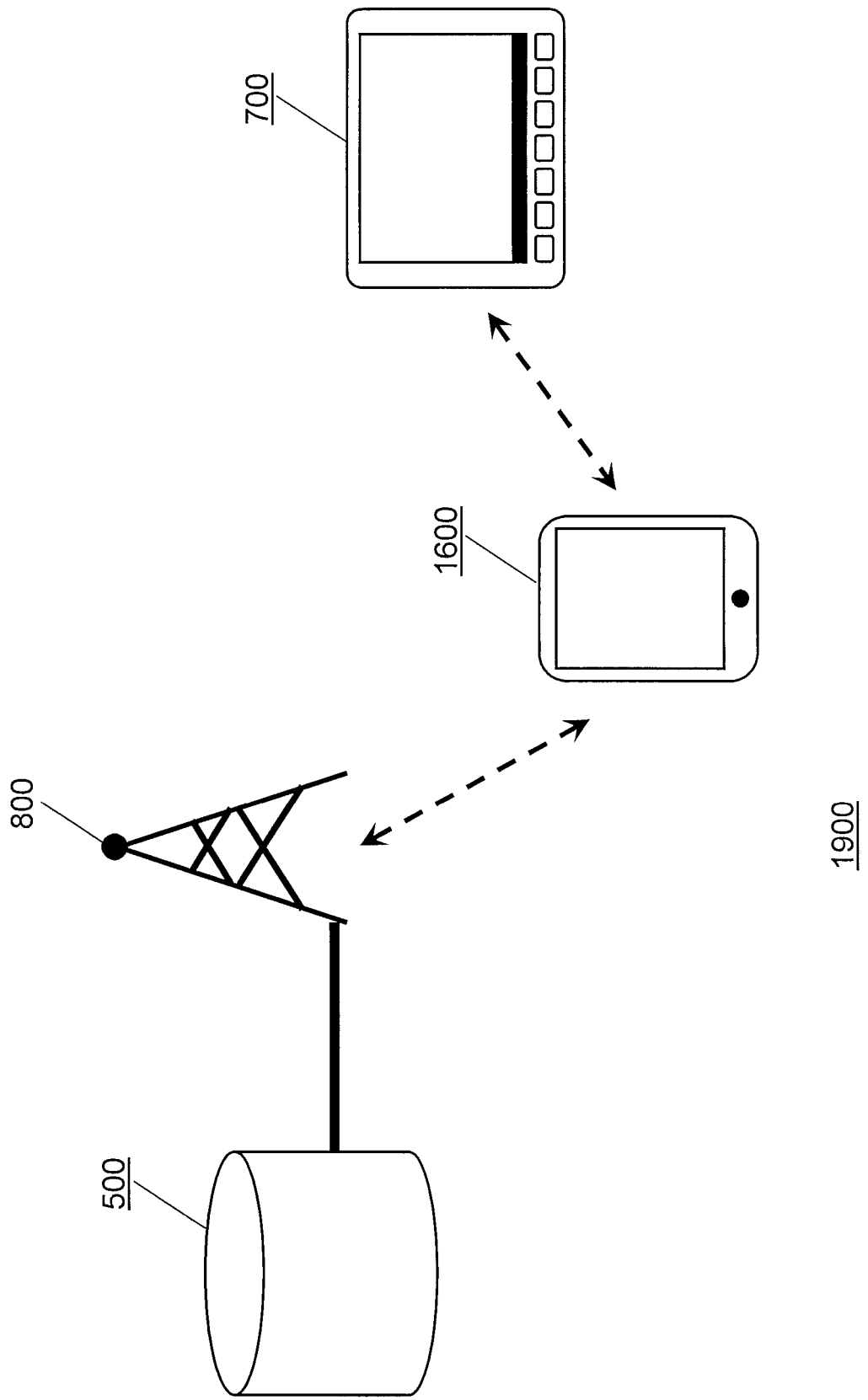

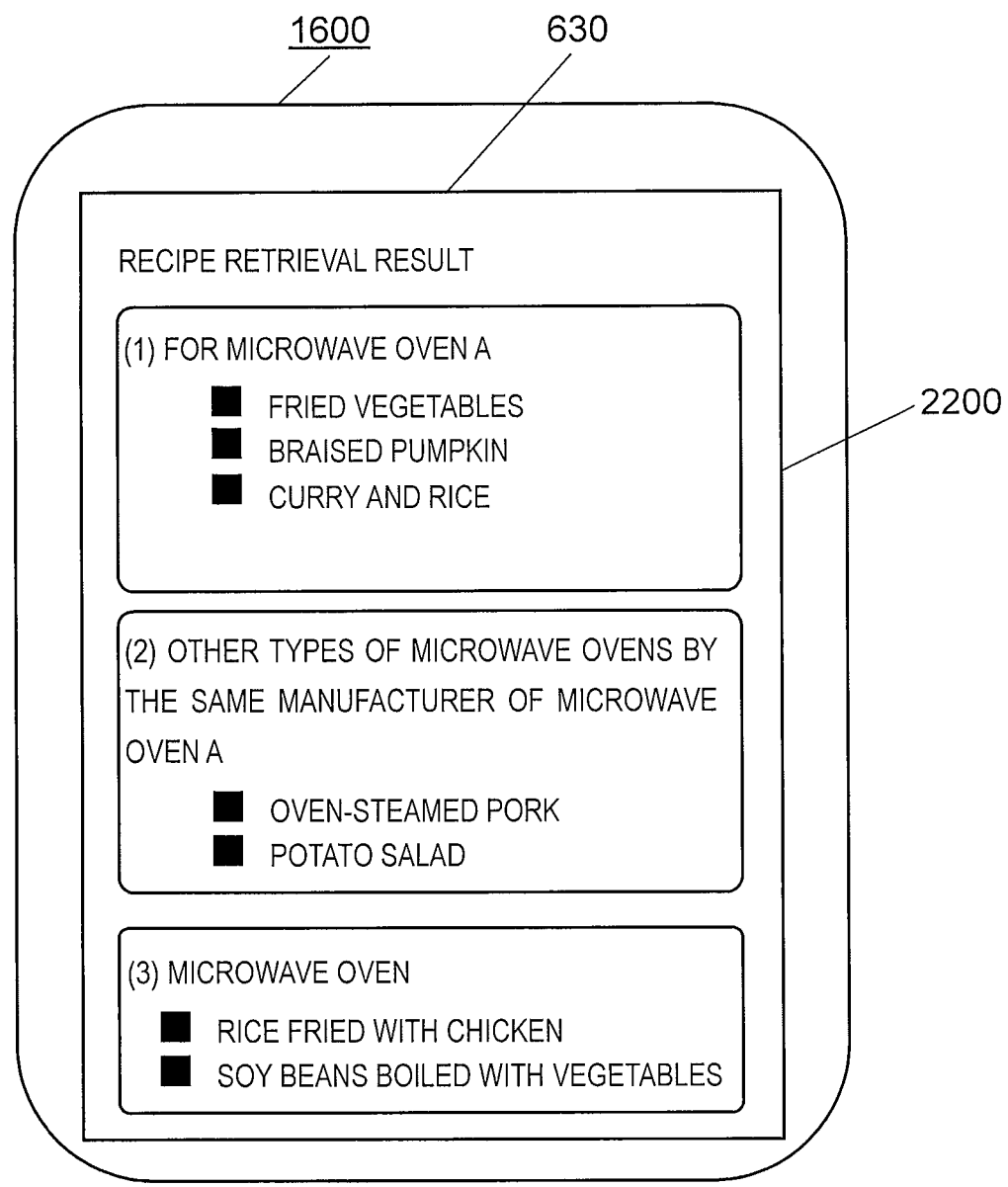

FIG. 19

FIRST DATABASE (MICROWAVE OVEN MANUFACTURER)

| COOKING RECIPE SPECIFYING ID | TITLE INFORMATION | COOKING PROCEDURE INFORMATION | TARGET APPARATUS INFORMATION | APPARATUS TYPE INFORMATION | OPERATION CONTROL INFORMATION |
|---|---|---|---|---|---|
| X001 | P001 | Q001 | MICROWAVE OVEN | A | R001 |
| X003 | P003 | Q003 | MICROWAVE OVEN | A | R002 |
| X003 | P003 | Q003 | MICROWAVE OVEN | B | R003 |
| X004 | P004 | Q004 | MICROWAVE OVEN | C | R004 |
| X006 | P006 | Q006 | MICROWAVE OVEN | D | R005 |

SECOND DATABASE (RICE COOKER MANUFACTURER)

| COOKING RECIPE SPECIFYING ID | TITLE INFORMATION | COOKING PROCEDURE INFORMATION | TARGET APPARATUS INFORMATION | APPARATUS TYPE INFORMATION | OPERATION CONTROL INFORMATION |
|---|---|---|---|---|---|
| X006 | P005 | Q005 | RICE COOKER | E | R006 |
| X007 | P006 | Q006 | RICE COOKER | F | R007 |

THIRD DATABASE (RECIPE CONTRIBUTION SERVICE)

| COOKING RECIPE SPECIFYING ID | TITLE INFORMATION | COOKING PROCEDURE INFORMATION | TARGET APPARATUS INFORMATION | APPARATUS TYPE INFORMATION | OPERATION CONTROL INFORMATION |
|---|---|---|---|---|---|
| X008 | P007 | Q007 | MICROWAVE OVEN | NOT PRESENT | R008 |
| X009 | P008 | Q008 | RICE COOKER | NOT PRESENT | R009 |
| X010 | P009 | Q009 | IH COOKING HEATER | NOT PRESENT | R010 |

INFORMATION TERMINAL, INFORMATION TERMINAL CONTROL METHOD, AND INFORMATION TERMINAL CONTROL PROGRAM

This application is a 371 application of PCT/JP2012/008357 having an international filing date of Dec. 27, 2012, which claims priority to JP 2012-046221 filed Mar. 2, 2012 and JP 2012-052680 filed Mar. 9, 2012, the entire contents of which are incorporated herein by reference.

TECHNICAL FIELD

The present invention relates to an information terminal, and particularly, an information terminal that receives a recipe or a cooking program provided from a server and transmits the received recipe or cooking program to a cooking apparatus, a method for controlling the information terminal, and a control program of the information terminal.

BACKGROUND ART

An information terminal that receives a recipe or a cooking program (also referred to as operation control information) for controlling an operation of a cooking apparatus, provided from a server, and transmits the received recipe or cooking program to a cooking apparatus using radio communication means has been proposed (for example, see PTL 1).

By using such an information terminal, a user receives the recipe or the cooking program from the server, so that the user can perform a variety of cooking using the cooking apparatus.

In recent years, many new recipes have been provided on the Internet. However, in general, since a cooking program is provided through many inspection processes by a manufacturer of a cooking apparatus, it is difficult to provide a cooking program for all recipes.

Accordingly, in the information terminal in the related art, when recipes are displayed, recipes associated with a cooking program and recipes that are not associated with a cooking program may be displayed mixed together, which lowers the visual perceptibility to a user.

Further, in a state where such a mixed display is performed, the user wastes time distinguishing between the recipes associated with the cooking program and the recipes that are not associated with the cooking program, which lowers the convenience of use for the user.

PATENT LITERATURE

PTL 1: Japanese Patent Unexamined Publication No. 2001-343128

SUMMARY OF THE INVENTION

There are provided an information terminal that transmits a cooking program to a cooking apparatus, capable of enhancing the convenience of use for the user while enhancing the visual perceptibility to the user, a method for controlling the information terminal, and a control program of the information terminal.

The information terminal includes a first radio communication unit that performs communication with a server that stores a cooking recipe information group that includes first cooking recipe information that is associated with operation control information and second cooking recipe information that is not associated with the operation control information. Further, the information terminal includes a condition input unit through which a condition for retrieving a specific cooking recipe information group from the cooking recipe information groups stored in the server is input, and a display unit that displays the specific cooking recipe information group specified based on the condition input through the condition input unit. Furthermore, the display unit displays a list screen on which the specific cooking recipe information group is displayed as a list so that the first cooking recipe information is differentiated from the second cooking recipe information and a cooking method screen on which a cooking method relating to specific cooking recipe information in the specific cooking recipe information group displayed on the list screen is displayed.

Further, there is provided a method for controlling an information terminal that performs communication with a server that stores a cooking recipe information group that includes first cooking recipe information that is associated with operation control information and second cooking recipe information that is not associated with the operation control information. The control method includes inputting a condition for retrieving a specific cooking recipe information group from the cooking recipe information groups stored in the server, and displaying as a list the specific cooking recipe information group specified based on the condition input by the inputting of the condition so that the first cooking recipe information is differentiated from the second cooking recipe information. Further, the control method includes displaying a cooking method relating to specific cooking recipe information in the specific cooking recipe information group displayed on the list screen.

Further, there is provided a control program of an information terminal that performs communication with a server that stores a cooking recipe information group that includes first cooking recipe information that is associated with operation control information and second cooking recipe information that is not associated with the operation control information. The control program causes a computer to execute inputting a condition for retrieving a specific cooking recipe information group from the cooking recipe information groups stored in the server, and displaying as a list the specific cooking recipe information group specified based on the condition input by the inputting of the condition so that the first cooking recipe information is differentiated from the second cooking recipe information. Furthermore, the control program causes the computer to execute displaying a cooking method relating to specific cooking recipe information in the specific cooking recipe information group displayed on the list screen.

As described above, since the first cooking recipe information that is associated with the operation control information and the second cooking recipe information that is not associated with the operation control information are displayed to be differentiated from each other, it is possible to enhance the convenience of use for the user while enhancing the visual perceptibility to the user.

Further, since the list screen that displays as a list the cooking recipe information group so that the first cooking recipe information is differentiated from the second cooking recipe information, and the cooking method screen that displays the cooking method relating to the specific cooking recipe information from the cooking recipe information group displayed on the list screen are displayed, it is possible to enhance the convenience of use for the user while enhancing the visual perceptibility to the user.

BRIEF DESCRIPTION OF THE DRAWINGS

FIG. 5A is a diagram illustrating an example of a display screen created by a control computation unit that receives a retrieval result after the user inputs a keyword, in the first exemplary embodiment of the invention.

FIG. 10 is a diagram illustrating another example of information stored in a cooking recipe information database, in the first exemplary embodiment of the invention.

FIG. 11 is a diagram illustrating an overall configuration of a communication system according to a second exemplary embodiment of the invention.

FIG. 15A is a diagram illustrating an example of a display screen created by a control computation unit that receives a retrieval result after the user inputs a keyword, in the second exemplary embodiment of the invention.

FIG. 19 is a diagram illustrating another example of information stored in a cooking recipe information database, in the second exemplary embodiment of the invention.

DETAILED DESCRIPTION OF THE PREFERRED EMBODIMENTS

Figure 1:
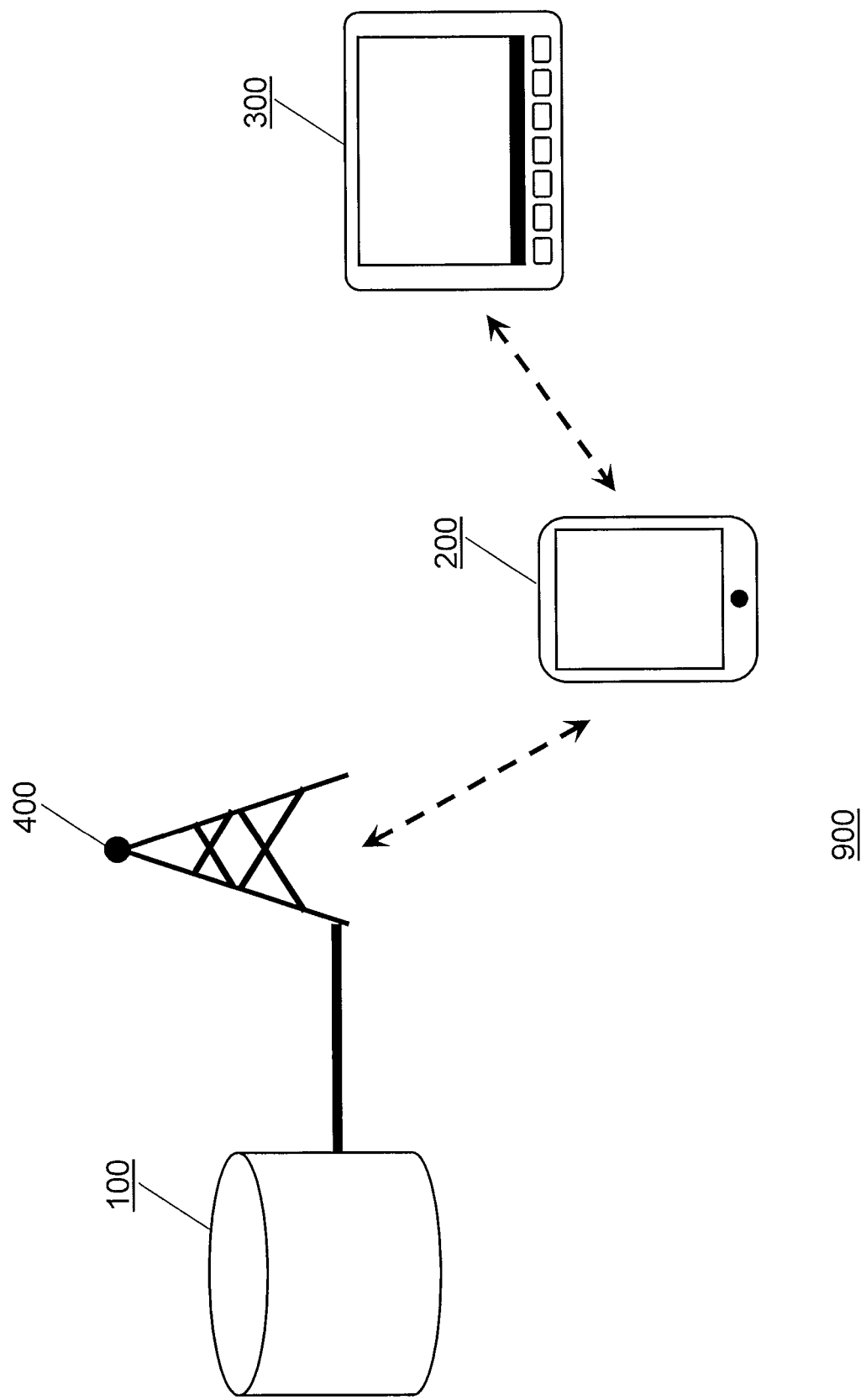
FIG. 1 is a diagram illustrating an overall configuration of a communication system according to a first exemplary embodiment of the invention.

Hereinafter, embodiments of the invention will be described with reference to the accompanying drawings. These embodiments do not limit the invention.
First Exemplary Embodiment FIG. 1 is a diagram illustrating an overall configuration of communication system 900 according to a first exemplary embodiment of the invention.

Communication system 900 includes server 100, information terminal 200, and cooking apparatus 300. In FIG. 1, an example in which server 100 and information terminal 200 are connected to each other for communication through base station 400 is shown. However, the invention is not limited to the example, and server 100 and information terminal 200 may be connected to each other through a network.

Cooking apparatus 300 includes a microwave oven, a rice cooker, an IH cooking heater, a toaster, a stove, a grill, an oven, a blender, a coffee maker, or the like.

Figure 2:
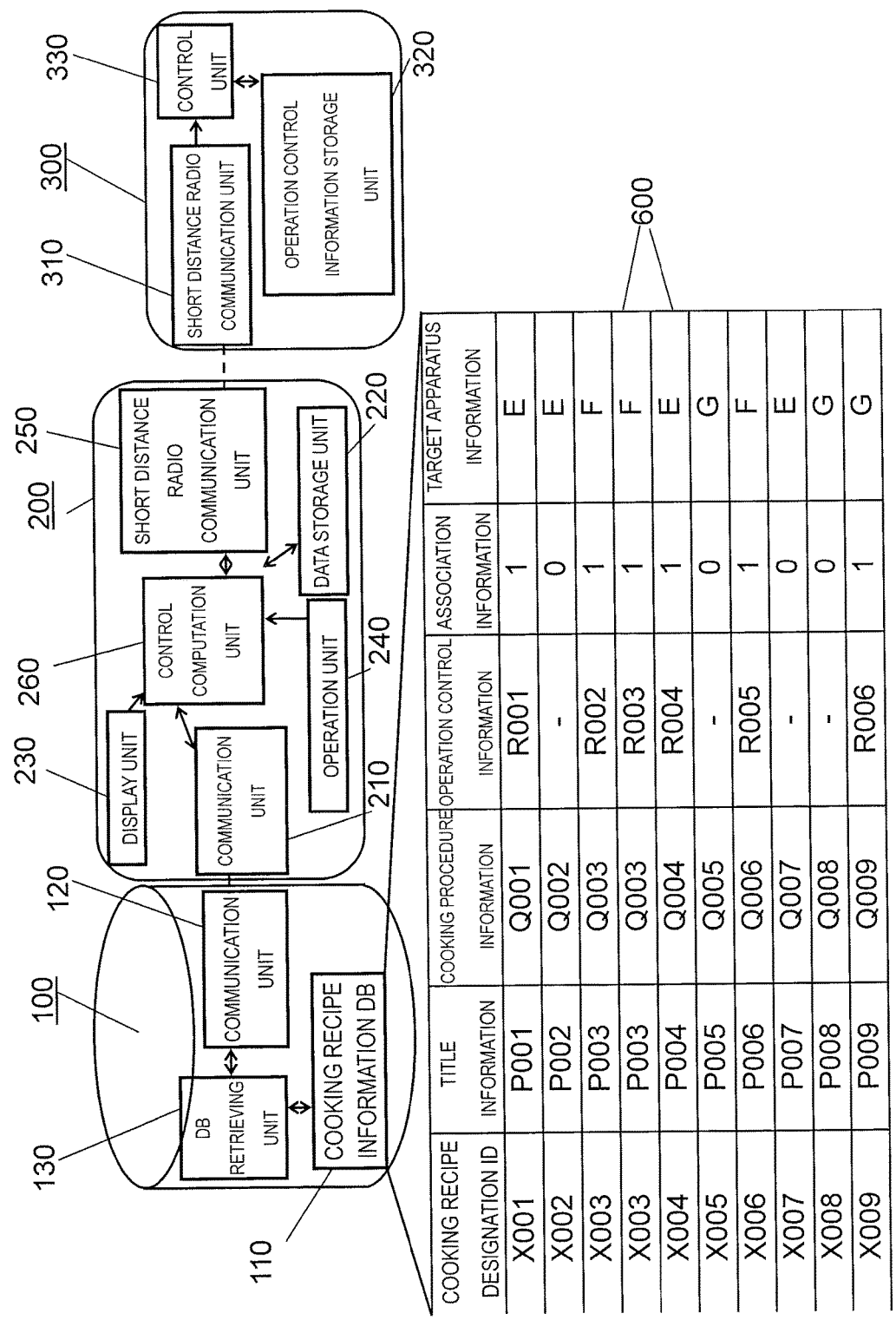
FIG. 2 is a block diagram illustrating respective configurations of a server, an information terminal, and a cooking apparatus according to the first exemplary embodiment of the invention.

FIG. 2 is a block diagram illustrating respective configurations of server 100, information terminal 200, and cooking apparatus 300 in the first exemplary embodiment of the invention.

First, server 100 includes cooking recipe information database 110, communication unit 120, and database retrieving unit 130.

Communication unit 120 is communication means, and performs communication with communication unit 210 of information terminal 200. For example, a communication network such as the Internet or data communication may be used as the communication means.

Cooking recipe information database 110 stores plural pieces of cooking recipe information 600 (cooking recipe information group). Plural pieces of cooking recipe information 600 include first cooking recipe information that is associated with operation control information, and second cooking recipe information that is not associated with the operation control information.

Here, cooking recipe information 600 refers to information including a cooking recipe designation ID, title information, cooking procedure information, the operation control information, association information, and target device information.

Cooking recipe designation ID refers to information having one-to-one correspondence with cooking recipe information 600, which is used in specifying cooking recipe information 600 stored in cooking recipe information database 110.

The title information refers to information indicating a title assigned to cooking recipe information 600, and specifically, information indicating a dish name (for example, curry and rice) of cooking recipe information 600, for example.

The cooking procedure information refers to information indicating details of a cooking procedure for making a dish, and specifically, a recipe.

The operation control information (cooking program) refers to optimal control information to be set when cooking apparatus 300 performs cooking in order to make the dish based on the cooking procedure information.

For example, it is assumed that cooking apparatus 300 is a microwave oven, and that the title information of the recipe is "gratin". Further, it is assumed that when the gratin is baked by an oven function of the microwave oven, it is necessary to heat the gratin for six minutes at 600 W. Here, the operation control information refers to information indicating the content of an operation of "heating for six minutes at 600 W", or refers to setting information for setting the microwave oven so that such a heating operation is performed.

The association information refers to information indicating whether cooking recipe information 600 includes the operation control information when cooking apparatus 300 is used during cooking based on the cooking procedure information.

The target device information refers to information for specifying the type (for example, the microwave oven, the rice cooker, or the like) of cooking apparatus 300 that uses the operation control information.

In FIG. 2, a specific example of the plural pieces of cooking recipe information 600 stored in cooking recipe information database 110 is shown. Here, in cooking recipe information 600 in which cooking recipe designation IDs are X002, X005, X007 and X008, an item of the operation control information is represented as "-". This means that the operation control information is not included in cooking recipe information 600, and the association information corresponding thereto is "0".

Further, cooking recipe information 600 in which cooking recipe designation ID is X003 represents that plural pieces of operation control information (R002 and R003) are included in one piece of cooking procedure information (Q003).

Database retrieving unit 130 retrieves specific cooking recipe information 600 (specific cooking recipe information group) corresponding to a condition from the plural pieces of cooking recipe information 600 stored in cooking recipe information database 110, according to an instruction, a keyword or the like transmitted from information terminal 200.

Next, information terminal 200 includes communication unit 210, data storage unit 220, display unit 230, operation unit 240, short distance radio communication unit 250, and control computation unit 260.

Communication unit 210 (a first radio communication unit) is communication means, and performs communication with communication unit 120 of server 100.

Data storage unit 220 stores a recipe or operation control information received by communication unit 210.

Display unit 230 is a display that displays the recipe or the like stored in data storage unit 220. Display unit 230 displays a specific cooking recipe information group specified based on a condition input by operation unit 240.

Operation unit 240 is means for a specific recipe being selected by the user when the plural recipes stored in data storage unit 220 are displayed as a list in display unit 230. Further, operation unit 240 may be means for performing a process of pressing a button displayed in display unit 230. In addition, operation unit 240 also functions as a condition input unit through which a condition for retrieving a specific recipe information group from the cooking recipe information groups stored in server 100 is input.

In the present embodiment, a configuration in which operation unit 240 is assembled in display unit 230 as a touch panel is shown, but a configuration in which display unit 230 and operation unit 240 are separately provided may be used.

Short distance radio communication unit 250 (a second radio communication unit) refers to means for communication with cooking apparatus 300, and for example, is realized using infrared data communication, specific low-power radio, near field communication (NFC), a radio tag, radio frequency identification (RFID), or the like.

Control computation unit 260 performs control for communication unit 210, data storage unit 220, display unit 230, operation unit 240 and short distance radio communication unit 250, and performs data computation for communication. Further, control computation unit 260 also performs creation of display screen data (list screens 1200 to 1202, cooking method screen 1400, or the like) for screen display (to be described later) or screen transition control of display unit 230.

Next, cooking apparatus 300 includes short distance radio communication unit 310, operation control information storage unit 320, and control unit 330.

Short distance radio communication unit 310 refers to means for communication with short distance radio communication unit 250 of information terminal 200, which is realized using a communication method corresponding to the communication method of short distance radio communication unit 250.

When the operation control information transmitted from server 100 is received through information terminal 200 to short distance radio communication unit 310, operation control information storage unit 320 stores the operation control information.

Control unit 330 refers to means for executing the operation control based on the operation control information stored in operation control information storage unit 320, and controls an operation unit (not shown) of cooking apparatus 300. The operation unit refers to means for transmitting microwaves, for example, if cooking apparatus 300 is the microwave oven, and refers to means for heating rice if cooking apparatus 300 is the rice cooker.

Next, an operation of communication system 900 according to the present embodiment will be described.

Figure 3:
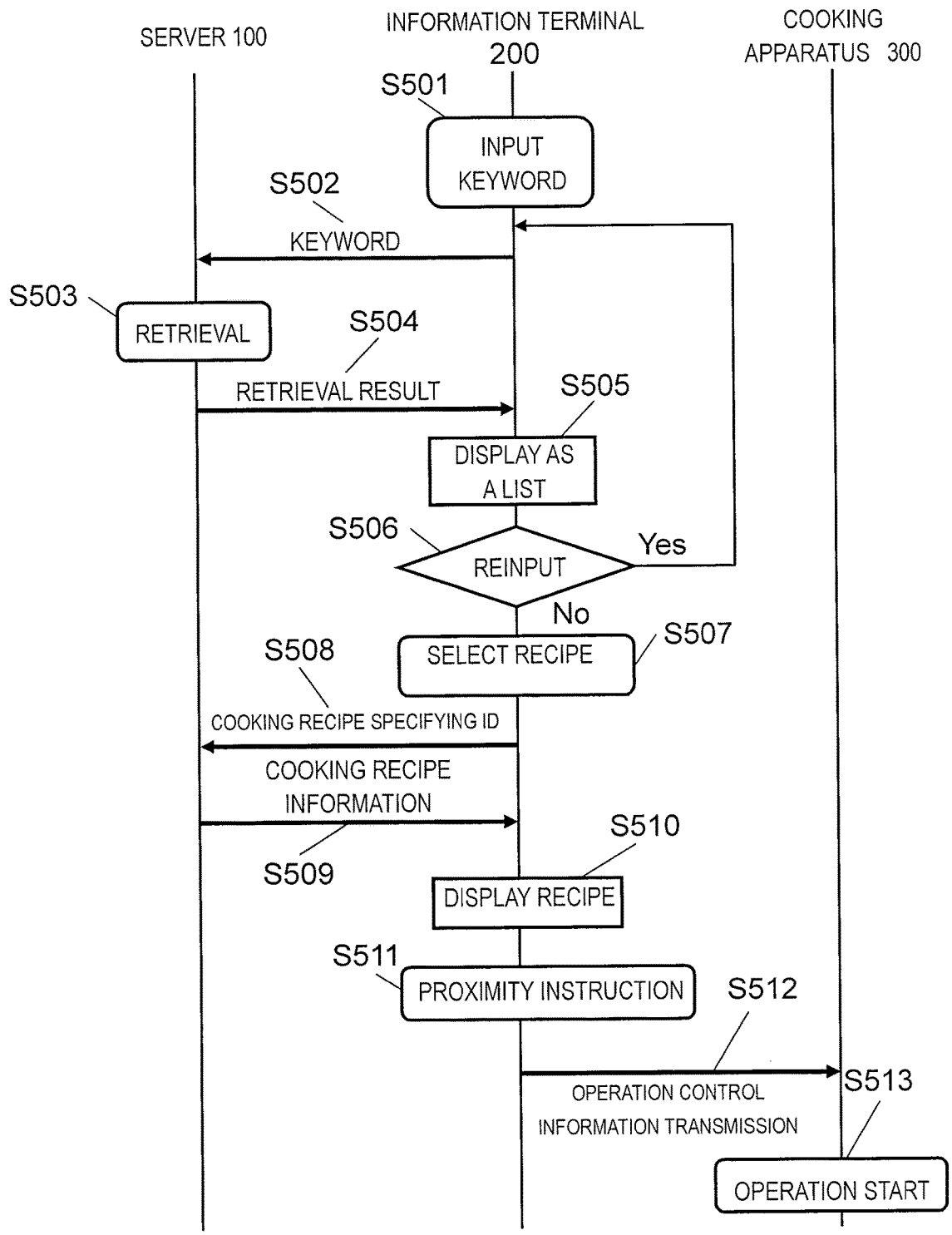
FIG. 3 is a diagram illustrating a communication sequence of the communication system according to the first exemplary embodiment of the invention.

FIG. 3 is a diagram illustrating a communication sequence of communication system 900 according to the first exemplary embodiment of the invention.

First, a user inputs a keyword relating to a recipe to be retrieved using operation unit 240 provided in information terminal 200 (S501).

The keyword input through operation unit 240 is transmitted to server 100 through communication unit 210 (S502).

Database retrieving unit 130 in server 100 that receives the keyword retrieves cooking recipe information 600 in which a word is used that matches with the keyword from entire cooking recipe information 600 (specifically, title information and cooking procedure information) stored in cooking recipe information database 110 (S503).

If cooking recipe information 600 in which the word that matches with the keyword is used is found, cooking recipe designation ID corresponding to cooking recipe information 600, the title information and the association information are transmitted to information terminal 200 through communication unit 120 as a retrieval result (S504).

If communication unit 210 receives the retrieval result, control computation unit 260 differentiates cooking recipe information 600 (first cooking recipe information) in which the association information is "1" from cooking recipe information 600 (second cooking recipe information) in which the association information "0" among cooking recipe information 600. In a state where cooking recipe information 600 that includes the operation control information and cooking recipe information 600 that does not include the operation control information in cooking recipe information 600 are differentiated from each other, control computation unit 260 generates display screen data in which the title information is displayed as a list, and displays the generated display screen data as list screens 1200 to 1202 in display unit 230 (S505).

The user checks the retrieval results displayed as a list, and if desired title information is not present, the user re-inputs a different keyword (S506, Yes) to operation unit 240, and database retrieving unit 130 in server 100 performs the retrieval again.

On the other hand, when the user checks the retrieval results, if the desired title information is found (S506, No), the user selects one piece of desired title information from the retrieval results using operation unit 240 (S507).

In step S507, if the desired title information is specified by the user, information terminal 200 transmits cooking recipe designation ID corresponding to the specified title information to server 100 through communication unit 210 in association with the specification (S508).

If server 100 receives cooking recipe designation ID through communication unit 120, database retrieving unit 130 reads specific recipe information 600 (which may not include the association information) corresponding to cooking recipe designation ID from cooking recipe information database 110. Further, database retrieving unit 130 transmits the read information to information terminal 200 through communication unit 120 (S509).

Information terminal 200 receives specific recipe information 600 through communication unit 210. Further, control computation unit 260 creates display screen data from the cooking procedure information included in received specific recipe information 600, and displays the recipe as cooking method screen 1400 (S510).

Next, control computation unit 260 causes display unit 230 to display a message screen for instructing bringing information terminal 200 and a specific portion of cooking apparatus 300 close to each other (S511).

If the user views the message screen and then makes information terminal 200 and the specific portion of cooking apparatus 300 be close to each other, the operation control information of cooking recipe information 600 specified in step S507 is transmitted to short distance radio communication unit 310 from short distance radio communication unit 250 (S512), and the operation control information is stored in operation control information storage unit 320.

Further, control unit 330 controls the operation unit to perform the operation control based on the operation control information stored in operation control information storage unit 320 (S513).

Next, a screen displayed by display unit 230 will be described.

Figure 4:
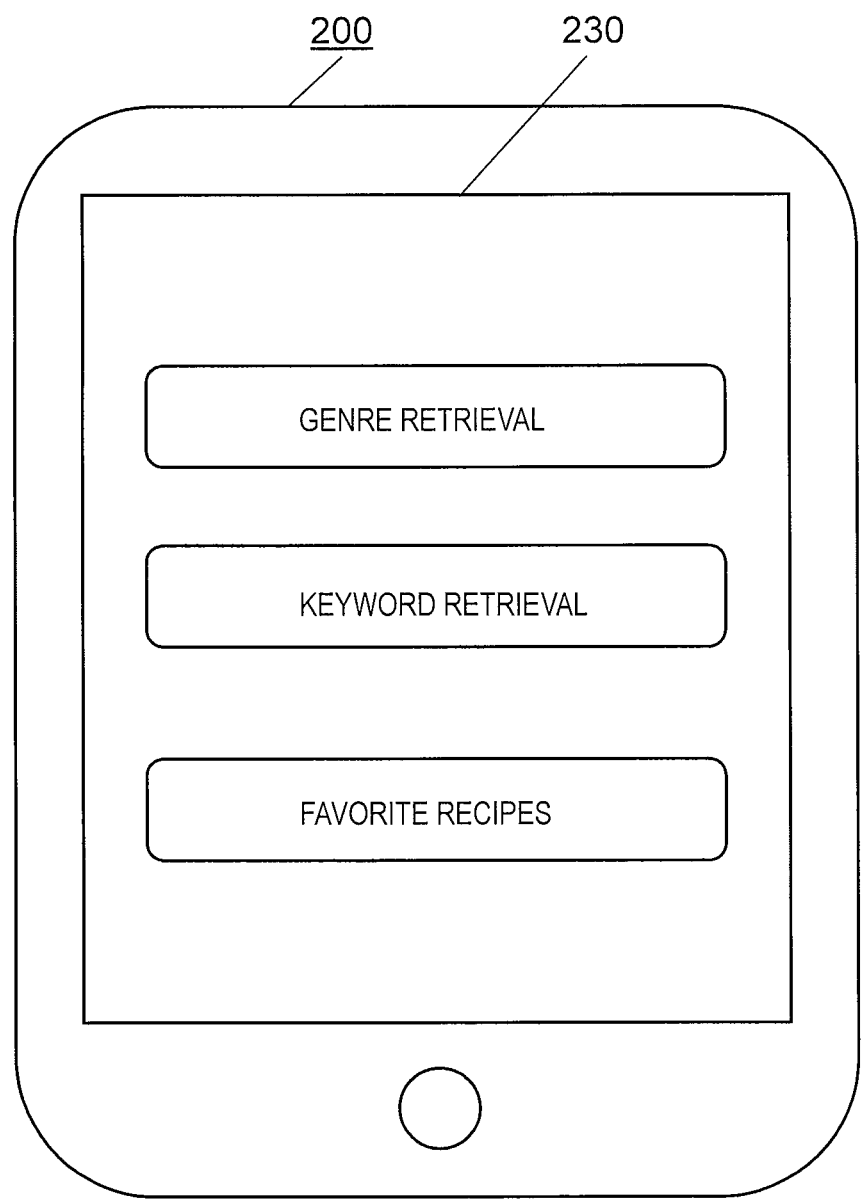
FIG. 4 is a diagram illustrating a screen for a recipe retrieving method displayed by a display unit being selected by a user in the information terminal of the first exemplary embodiment of the invention.

FIG. 4 is a diagram illustrating a screen for a recipe retrieving method displayed by display unit 230 selected by a user in information terminal 200 of the first exemplary embodiment of the invention.

When performing the keyword input shown in step S501, the user selects an input method based on the screen shown in FIG. 4.

In the present embodiment, an example in which the user selects a middle button, that is, keyword retrieval to perform retrieval is described, but the invention is not limited thereto. The user may perform the recipe retrieval using another method ("genre retrieval" or "favorite recipes") displayed in FIG. 4, or the like.

The "genre retrieval" refers to a method for selecting a classification that the user desires from target cooking classifications (vegetable, meat, fish or the like) to retrieve the recipe. Further, the "favorite recipes" refer to a method for displaying as a list recipes selected by the user over a predetermined time, for example, over the last one month for selection by the user.

If the "keyword retrieval" on the display screen in FIG. 4 is pressed, a keyword input section is displayed, so that the user inputs a keyword relating to a desired recipe.

Figure 5B:
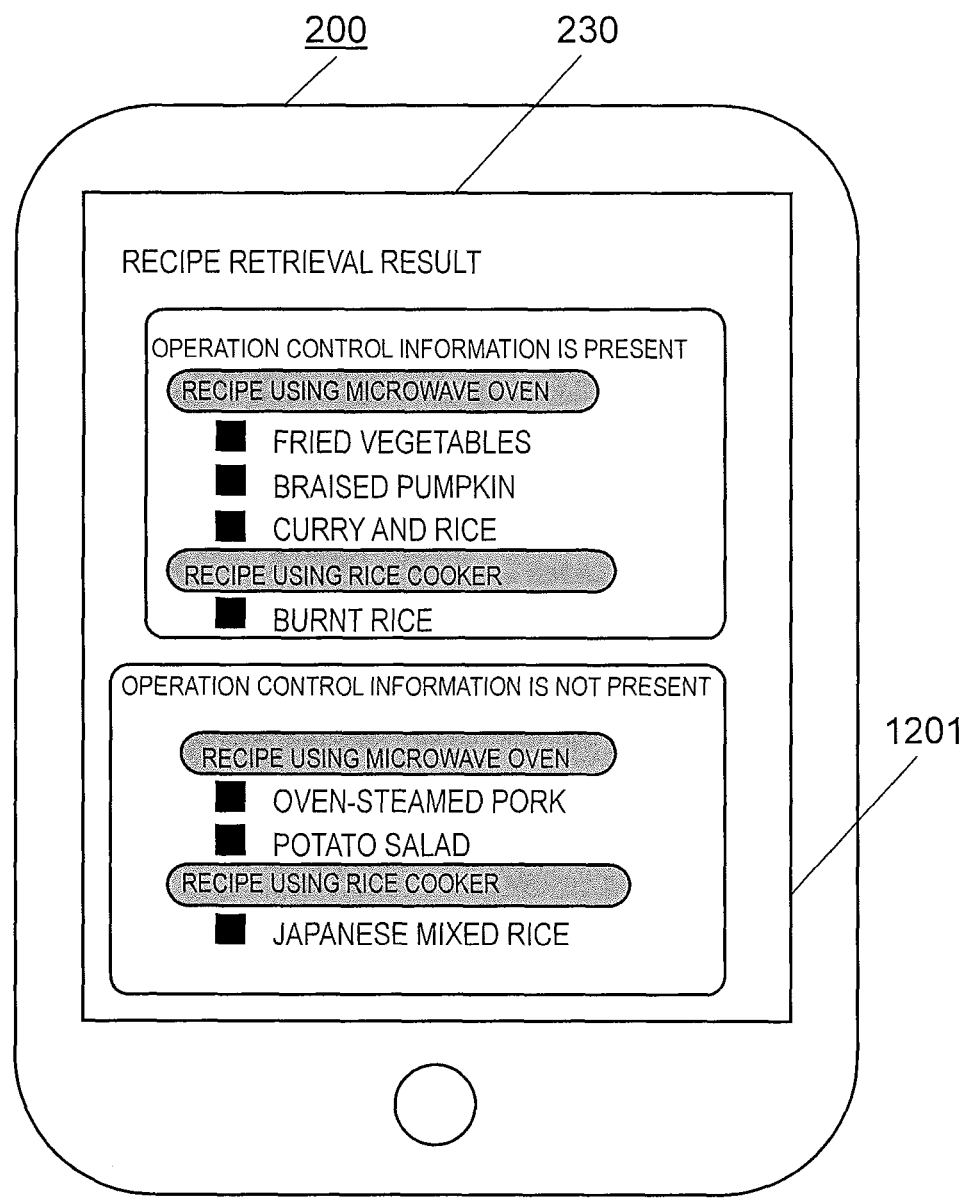
FIG. 5B is a diagram illustrating another example of the display screen created by the control computation unit that receives the retrieval result after the user inputs the keyword, in the first exemplary embodiment of the invention.
Figure 6:
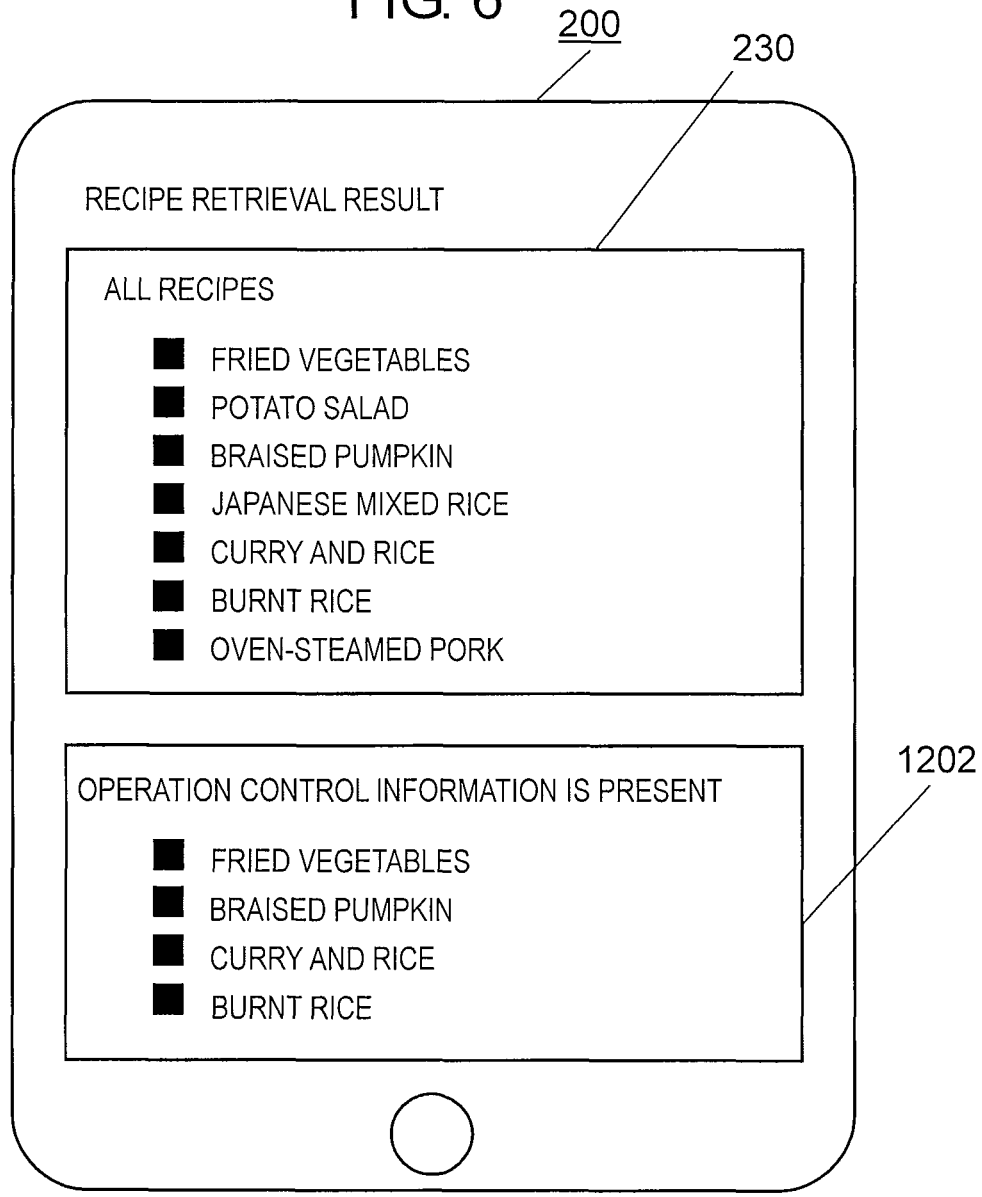
FIG. 6 is a diagram illustrating still another example of the display screen created by the control computation unit that receives the retrieval result after the user inputs the keyword, in the first exemplary embodiment of the invention.

FIGS. 5A, 5B and 6 are diagrams illustrating display screens created by control computation unit 260 that receives the retrieval result after the user inputs the keyword, in the first exemplary embodiment of the invention. These display screens correspond to list screens 1200 to 1202 displayed in step S505 in FIG. 3.

In an example shown in FIG. 5A, recipes (specific cooking recipe information group) that are the retrieval results are separately displayed in display unit 230 as list screen 1200 so that cooking recipe information (first cooking recipe information) that is associated with the operation control information and cooking recipe information (second cooking recipe information) that is not associated with the operation control information are differentiated from each other at a glance.

That is, display unit 230 displays list screen 1200 that displays as a list the specific recipe information group so that the first cooking recipe information and the second cooking recipe information are differentiated from each other.

Further, as an example shown in FIG. 5B, in display unit 230, the specific cooking recipe information group is separately displayed as list screen 1201 so that the cooking recipe information that is associated with the operation control information and the cooking recipe information that is not associated with the operation control information are differentiated from each other at a glance, and so that a recipe in each piece of cooking recipe information matches with the type of cooking apparatus 300 to be used.

When the list display shown in FIG. 5B is performed, in the above-described step S505, the display screen data may be separately generated for each type using the target device information included in cooking recipe information 600.

Further, as an example shown in FIG. 6, all the specific cooking recipe information group may be displayed in display unit 230 as list screen 1202, and the recipes associated with the operation control information may be displayed to be differentiated.

By using any one of the display screens of FIGS. 5A and 5B and FIG. 6, it is possible to recognize the recipes associated with the operation control information at a glance.

Figure 7:
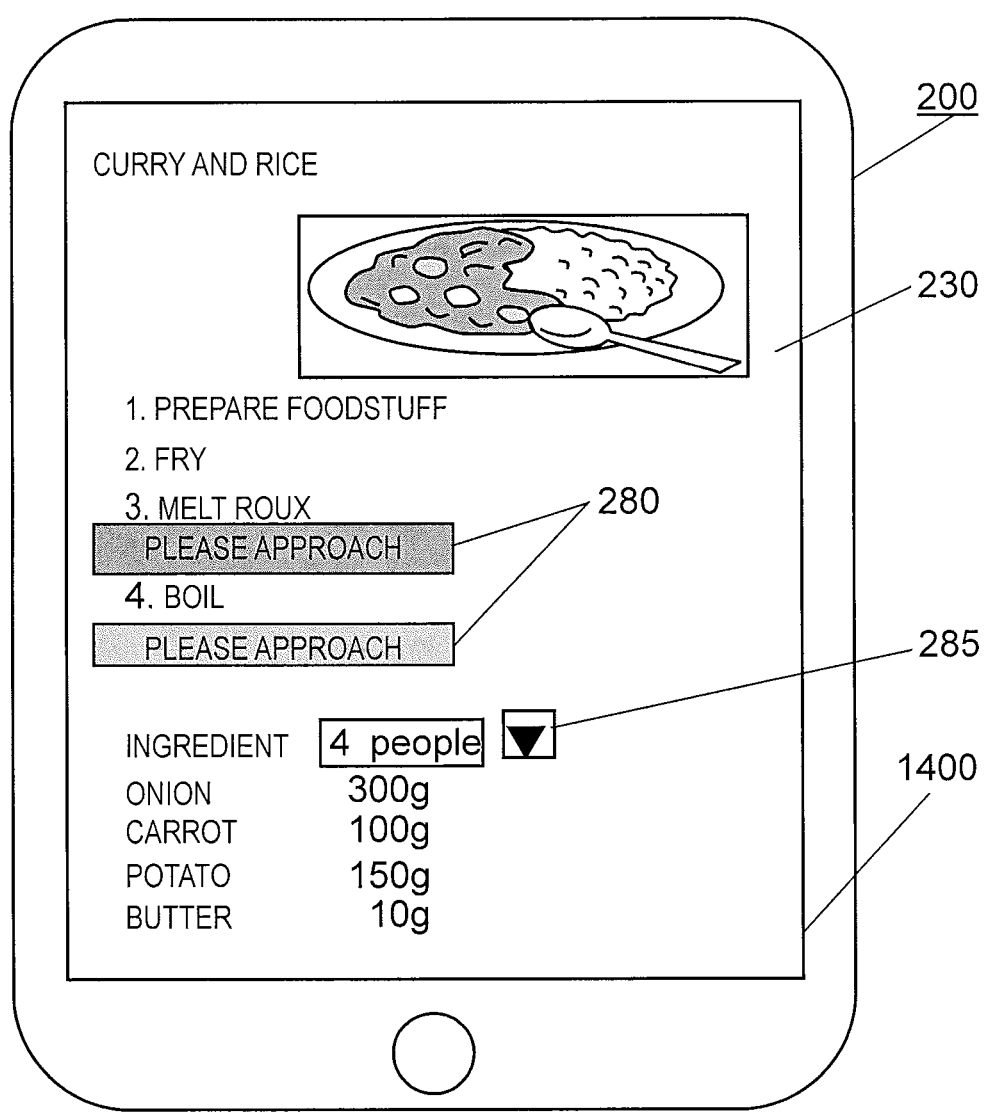
FIG. 7 is a diagram illustrating an example of a cooking method screen displayed when the user selects a recipe, in the first exemplary embodiment of the invention.

FIG. 7 is a diagram illustrating an example of cooking method screen 1400 displayed when the user selects a recipe, in the first exemplary embodiment of the invention. The display screen corresponds to the recipe display displayed in step S510 in FIG. 3.

FIG. 7 shows cooking method screen 1400 displayed when "curry and rice" displayed as a menu having the operation control is selected by operation unit 240, on list screens 1200 to 1202 shown in FIGS. 5A, 5B and 6.

Information in FIG. 7 is generated from the cooking procedure information by control computation unit 260. As a method for cooking the curry and rice, a procedure of (1) preparing foodstuff, (2) frying the foodstuff, (3) pouring curry roux and water into a pot and heating the mixture by cooking apparatus 300 to melt the roux, and (4) pouring the foodstuff into the pot where the curry roux is melted and heating the mixture by cooking apparatus 300 is shown.

That is, display unit 230 displays cooking method screen 1400 that shows the cooking method relating to the specific cooking recipe information in the specific cooking recipe information group displayed on list screens 1200 to 1202.

In (3) and (4) of the cooking procedure, the heating operation using cooking apparatus 300 is necessary, and thus, it is necessary to transmit optimal setting information according to the recipe to cooking apparatus 300.

On the other hand, on the cooking method screen shown in FIG. 7, on a lower side of each of (3) and (4) of the cooking procedure, proximity instruction mark 280 for requesting that the user brings information terminal 200 and the specific portion of cooking apparatus 300 close to each other is shown. Thus, it is possible to guide the user in a time series manner, and thus, it is also possible to enhance the convenience of use for the user. The close portion may be an operation portion of cooking apparatus 300, or may be the vicinity of short distance radio communication unit 310 or the vicinity of the position of an antenna may be used.

That is, display unit 230 displays the cooking method with the lapse of time, and displays a button for instructing transmission of the operation control information to cooking apparatus 300 through the second radio communication unit, in a time series manner at a position where the operation control information is necessary, on cooking method screen 1400.

Thus, it is possible to guide the user in a time series manner, and thus, it is possible to further enhance the convenience of use for the user.

Further, on a lower side of cooking method screen 1400, user number change setting mark 285 is also displayed, so that the user can press user number change setting mark 285 to change the number of users.

Figure 8:
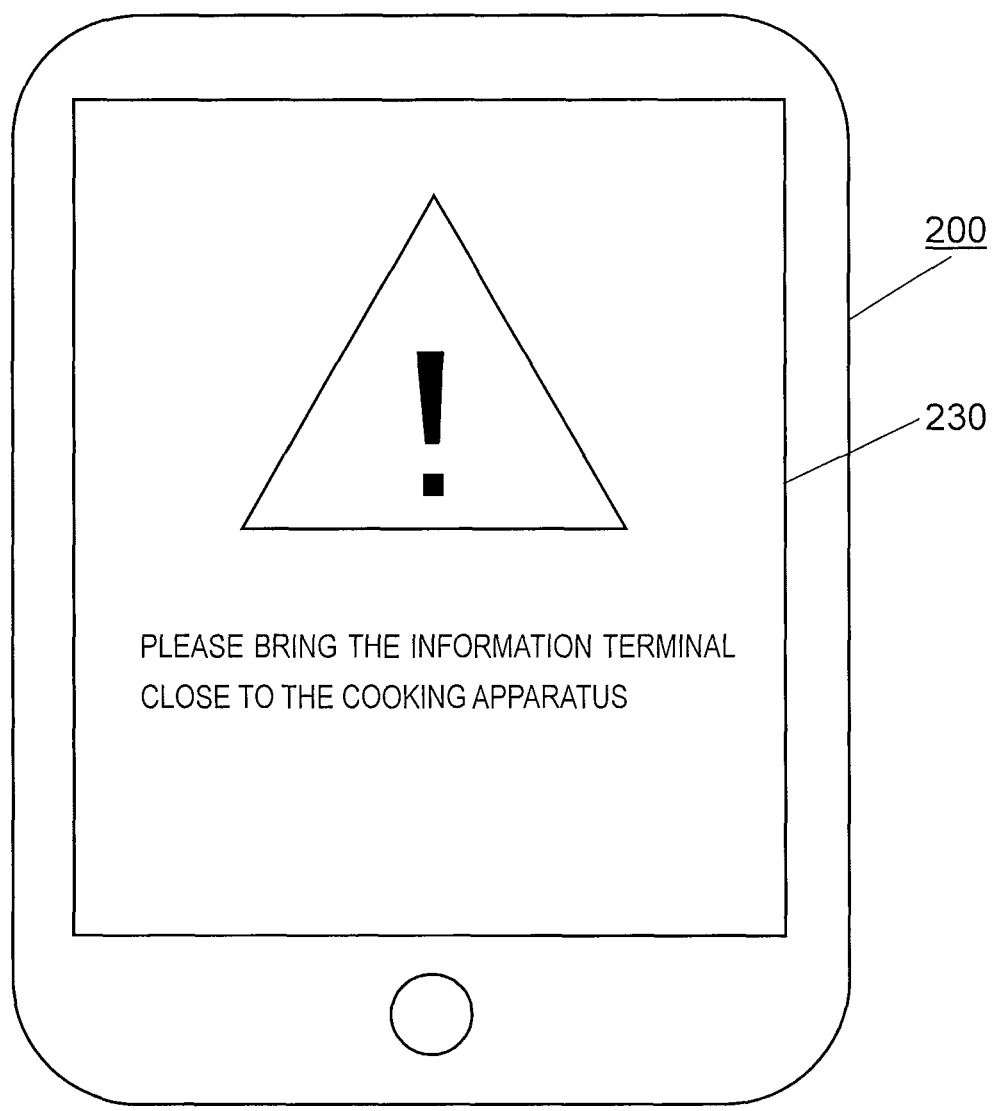
FIG. 8 is a diagram illustrating an example of a screen for requesting that the user brings the information terminal and the cooking apparatus close to each other, in the first exemplary embodiment of the invention.

If the user presses proximity instruction mark 280 of (3) or (4) of the cooking procedure, a screen for requesting that the user brings information terminal 200 and the specific portion of cooking apparatus 300 close to each other is displayed as shown in FIG. 8.

FIG. 8 is a diagram illustrating an example of the screen for requesting that the user brings information terminal 200 and the specific portion of cooking apparatus 300 close to each other, in the first exemplary embodiment of the invention. The display screen corresponds to the proximity instruction display displayed in step S511 in FIG. 3.

The user brings information terminal 200 close to the specific portion of cooking apparatus 300. Then, the operation control information that is setting information that is appropriately determined in advance is transmitted to short distance radio communication unit 310 from short distance radio communication unit 250, in (3) or (4) of the cooking procedure. The operation control information received in short distance radio communication unit 310 is stored in operation control information storage unit 320. Then, control unit 330 controls the operation unit to perform the operation control based on the operation control information.

That is, when the specified recipe displayed on cooking method screen 1400 of display unit 230 is the first cooking recipe associated with the operation control information, short distance radio communication unit 250 (second radio communication unit) transmits the operation control information corresponding to the first cooking recipe to cooking apparatus 300.

Accordingly, it is not necessary for the user to manually perform complicated cooking setting, and it is possible to simply set optimal operation control information in cooking apparatus 300.

Further, with a configuration in which short distance radio communication unit 250 (second radio communication unit) performs short distance radio communication, the user transmits the operation control information to cooking apparatus 300 in the vicinity of cooking apparatus 300. Thus, even when malfunction occurs in cooking apparatus 300, it is possible to rapidly handle the malfunction, and to prevent a fire, dry heating, contamination of inappropriate foodstuff, or the like.

As an example of proximity instruction mark 280, in FIGS. 7 and 8, a message "please approach (to the cooking apparatus)" is displayed, but the invention is not limited thereto. For example, a message indicating transmission of the operation control information may be used.

An example is described in which, in step S508 described in FIG. 3, server 100 receives a recipe request signal through communication unit 120, and reads detailed data on the recipe and the operation control information relating to the specified recipe from cooking recipe information database 110, and in step S509, the read information is transmitted to information terminal 200 through communication unit 120. However, the invention is not limited thereto. For example, as another method, in step S509, only the detailed data on the recipe may be transmitted, and the operation control information relating to the recipe may be separately transmitted to information terminal 200 from server 100. In this case, as a message to be displayed as proximity instruction mark 280, a display that requests the user to download the operation control information from server 100 may be used.

Further, proximity instruction mark 280 may employ a configuration in which a display color or a display type is changed according to whether proximity instruction mark 280 is pressed. That is, display unit 230 displays the button for instructing the transmission of the operation control information to cooking apparatus 300 through short distance radio communication unit 250 so that the button that is already pressed and the button that is not pressed are differentiated from each other. Thus, it is possible for the user to recognize the cooking steps up to now, and to prevent a mistake of pressing same proximity instruction mark 280 again. In this way, it is possible to prevent double pressing by the user, and thus, it is possible to further enhance the convenience of use for the user.

In FIG. 7, proximity instruction mark 280 corresponding to (3) of the cooking procedure is displayed by a dark color as the button that is already pressed, and proximity instruction mark 280 corresponding to (4) of the cooking procedure is displayed by a light color as the button that is not yet pressed. Further, the color of the mark may be changed before and after the pressing, or instead, the pressed short distance instruction mark may be erased from the screen display.

Further, user number change setting mark 285 refers to a mark capable of changing the number of users when the user presses the mark.

Figure 9:
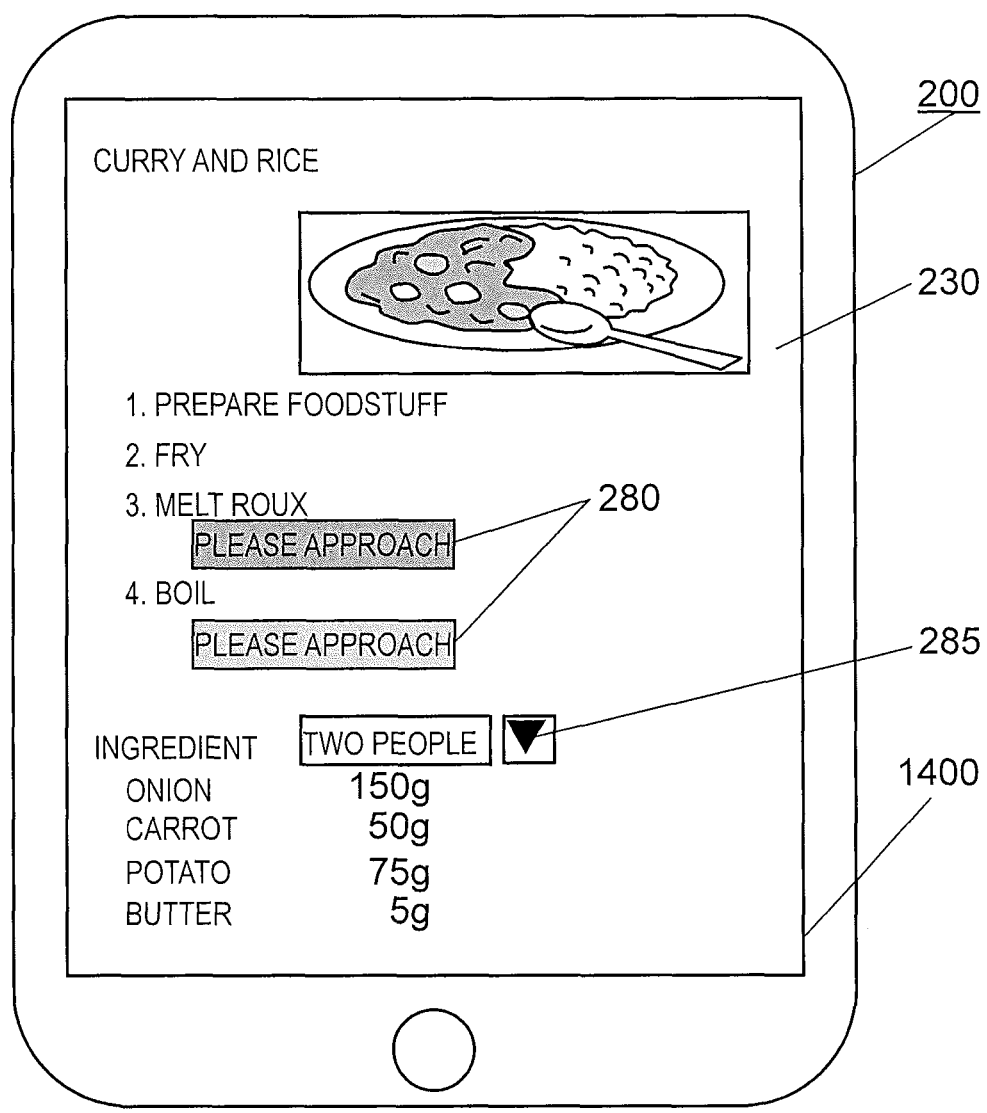
FIG. 9 is a diagram illustrating an example of a cooking method screen displayed when the user selects a recipe, in the first exemplary embodiment of the invention.

FIG. 9 is a diagram illustrating an example of cooking method screen 1400 displayed when the user selects the recipe, in the first exemplary embodiment of the invention.

FIG. 9 shows a screen displayed when the number of users set to four in FIG. 7 is changed to two. By decreasing the number of users to a half, the amount of the foodstuff displayed is decreased to half compared with the example shown in FIG. 7. Further, in FIG. 9, when proximity instruction mark 280 is pressed, the operation control information (for example, half the heating cooking time) suitable for heating and cooking the foodstuff that is a half compared with FIG. 7 is transmitted to cooking apparatus 300.

Thus, it is possible to simply create the operation control information based on the number in the family of the user, and thus, it is possible to further enhance the convenience of use for the user.

In order to realize this function, when the number of users is changed using user number change setting mark 285, information terminal 200 sends an inquiry to server 100, and then, server 100 retrieves the operation control information suitable for a half of material from cooking recipe information database 110 and transmits the result to information terminal 200. Further, after the number of users is changed using user number change setting mark 285, information terminal 200 may send an inquiry to server 100 when proximity instruction mark 280 is pressed, to obtain the operation control information suitable for the material corresponding to the number of users.

FIG. 10 is a diagram illustrating another example of information stored in cooking recipe information database 110, in the first exemplary embodiment of the invention.

In cooking recipe information database 110 shown in FIG. 2, cooking recipe information 600 that includes the operation control information and cooking recipe information 600 that does not include the operation control information are mixed, but as shown in FIG. 10, a first database and a second database are separately provided for management. The first database stores cooking recipe information 600 having the association information of "1", that is, cooking recipe information 600 that includes the operation control information, and the second database stores cooking recipe information 600 having the association information of "0", that is, cooking recipe information 600 that does not include the operation control information.

When cooking recipe information 600 is managed as shown in FIG. 10, a manufacturer of cooking apparatus 300 or the like that actually creates a recipe program (operation control information) may manage only the first database. Accordingly, it is possible to reduce the burden of the manufacturer. Further, as the manufacturer manages the first database, it is possible to obtain an effect of enhancing the reliability for the cooking recipe.

Further, server 100 separates cooking recipe information 600 that includes the operation control information and cooking recipe information 600 that does not include the operation control information to manage the database. Thus, in step S504 in FIG. 3, server 100 can individually transmit cooking recipe designation ID, the title information, and the association information about cooking recipe information 600 that includes the operation control information, and cooking recipe designation ID, the title information, and the association information about cooking recipe information 600 that does not include the operation control information.

Due to such a method, in control computation unit 260 that receives the information, it is not necessary to perform a process of separating cooking recipe information 600 having the association information of "1" from cooking recipe information 600 having the association information of "0".

Second Exemplary Embodiment

Next, a second exemplary embodiment of the invention will be described with reference to the accompanying drawings.

FIG. 11 is a diagram illustrating an overall configuration of communication system 1900 in the second exemplary embodiment of the invention.

Communication system 1900 includes server 500, information terminal 1600, and cooking apparatus 700. In FIG. 11, an example is shown in which server 500 and information terminal 1600 are connected to each other for communication through base station 800 is shown. However, the invention is not limited thereto, and server 500 and information terminal 1600 may be connected to each other through a network.

Cooking apparatus 700 includes, for example, a microwave oven, a rice cooker, an IH cooking heater, a toaster, a stove, a grill, an oven, a mixer, a coffee maker, or the like.

Figure 12:
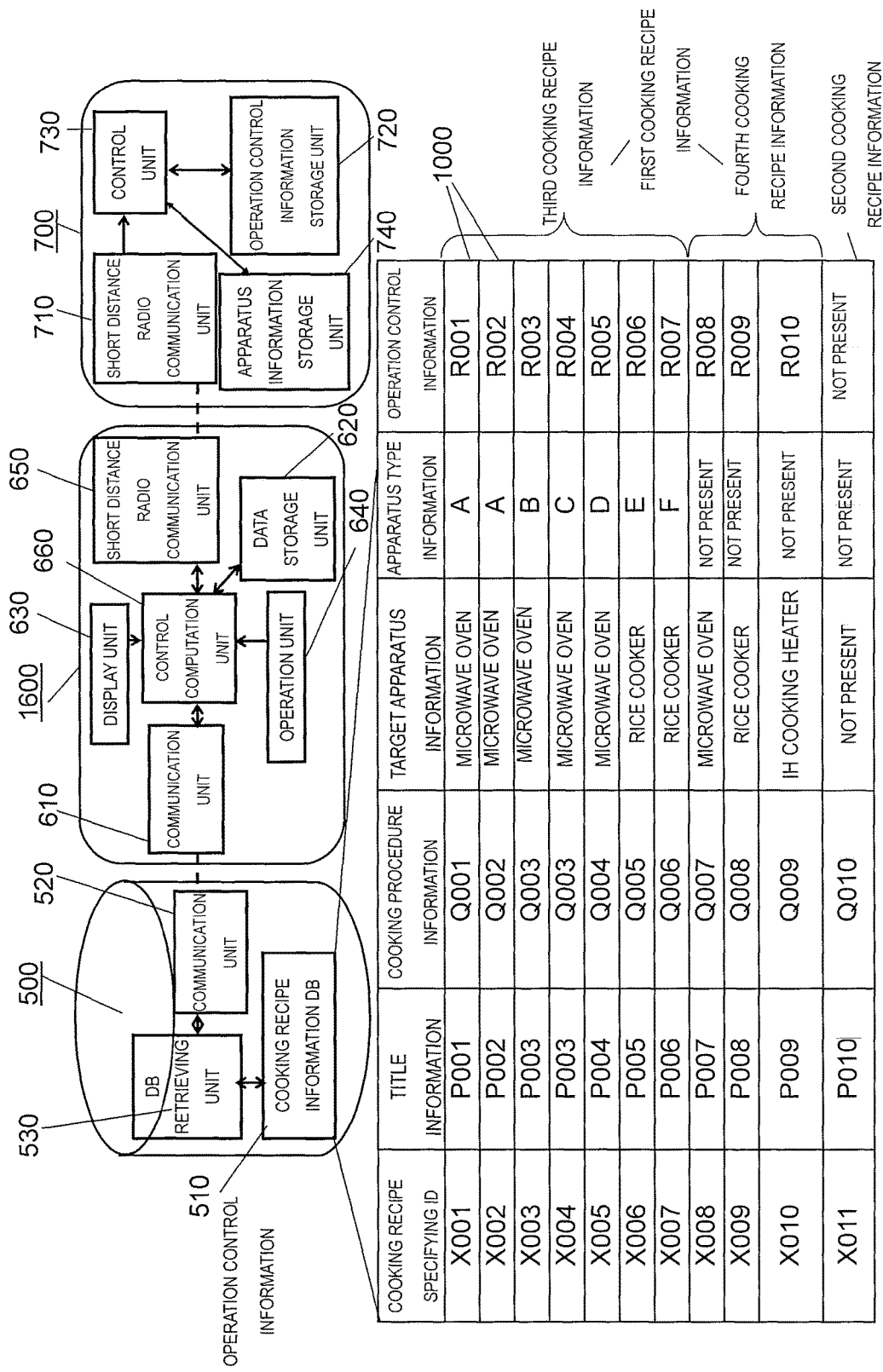
FIG. 12 is a block diagram illustrating respective configurations of a server, an information terminal, and a cooking apparatus according to the second exemplary embodiment of the invention.

FIG. 12 is a block diagram illustrating respective configurations of server 500, information terminal 1600, and cooking apparatus 700 in the second exemplary embodiment of the invention.

First, server 500 includes cooking recipe information database 510, communication unit 520, and database retrieving unit 530.

Communication unit 520 is communication means, and performs communication with communication unit 610 of information terminal 1600. For example, a communication network such as the Internet or data communication may be used as the communication means.

Cooking recipe information database 510 stores plural pieces of cooking recipe information 1000 (cooking recipe information group). The plural pieces of cooking recipe information 1000 include first cooking recipe information that is associated with operation control information, and second cooking recipe information that is not associated with operation control information. Further, the first cooking recipe information includes third cooking recipe information that is associated with specific information for specifying the cooking apparatus, and fourth cooking recipe information that is not associated with the specific information.

Here, cooking recipe information 1000 refers to information including cooking recipe designation ID, title information, cooking procedure information, target apparatus information, apparatus information, and operation control information. Further, when cooking apparatus 700 is used during cooking based on the cooking procedure information, cooking recipe information 1000 may include association information that is information indicating whether cooking recipe information 1000 includes the operation control information.

Cooking recipe designation ID refers to information corresponding to cooking recipe information 1000 one to one, which is used in specifying cooking recipe information 1000 stored in cooking recipe information database 510.

The title information refers to information indicating a title assigned to cooking recipe information 1000, and specifically, information indicating a dish name (for example, curry and rice) of cooking recipe information 1000, for example.

The cooking procedure information refers to information indicating details of a cooking procedure for making a dish, and specifically, a recipe.

The target apparatus information refers to information for specifying the type (for example, the microwave oven, the rice cooker or the like) of cooking apparatus 700 that uses the operation control information.

The apparatus type information refers to information for specifying a maker of cooking apparatus 700 or the type thereof, and for example, includes a maker name, a product number or the like of cooking apparatus 700.

The operation control information refers to optimal operation control information (cooking program) to be set when cooking apparatus 700 performs cooking in order to make the dish based on the cooking procedure information.

For example, it is assumed that cooking apparatus 700 is the microwave oven, and that the title information of the recipe is "gratin". Further, it is assumed that when the gratin is baked by an oven function of the microwave oven, it is necessary to heat the gratin for six minutes at 600 W. Here, the operation control information refers to information indicating the content of an operation of "heating for six minutes at 600 W", or refers to setting information for setting the microwave oven so that such a heating operation is performed.

That is, the third cooking recipe information and the fourth cooking recipe information refer to the first cooking recipe information that includes control information of cooking apparatus 700 based on cooking content as the operation control information.

In the present embodiment, an example in which the above-described apparatus type information is used as the specific information for specifying cooking apparatus 700 is described, but the specific information may include the apparatus type information and the target apparatus information.

In FIG. 12, a specific example of the plural pieces of cooking recipe information 1000 stored in cooking recipe information database 510 is shown. Here, cooking recipe information 1000 in which cooking recipe designation IDs are X001 to X007 refers to information (the third cooking recipe information) that includes the apparatus type information, but cooking recipe information 1000 in which cooking recipe designation IDs are X008 to X010 refers to information that does not include the apparatus type information (the fourth cooking recipe information). Each piece of cooking recipe information 1000 corresponding to X008 to X010 does not specify the apparatus type, and thus, includes the operation control information capable of performing cooking by a general-purpose microwave oven, a rice cooker or an IH cooking heater.

Further, cooking recipe information 1000 in which cooking recipe designation ID is X011 does not include the operation control information (the second cooking recipe information).

Generally, the operation control information that includes the apparatus type information is information that is provided by the manufacturer of cooking apparatus 700 or the like, for example. By specifying the apparatus type of cooking apparatus 700 and performing various inspection operations, it is possible to provide a cooking program in cooking conditions (for example, a heating output, a heating time and the like) suitable for the apparatus type.

Further, the operation control information that does not include the apparatus type information is a general-purpose cooking program used in general cooking apparatus 700, provided by a cook, for example.

Database retrieving unit 530 retrieves specific cooking recipe information 1000 (specific cooking recipe information group) corresponding to a condition from the plural pieces of cooking recipe information 1000 stored in cooking recipe information database 510, according to an instruction, a keyword or the like transmitted from information terminal 1600.

Next, information terminal 1600 includes communication unit 610, data storage unit 620, display unit 630, operation unit 640, short-distance radio communication unit 650, and control computation unit 660.

Communication unit 610 (first radio communication unit) is communication means, and performs communication with communication unit 520 of server 500.

Data storage unit 620 stores a recipe or operation control information received by communication unit 610. Further, data storage unit 620 stores target apparatus information or apparatus type information of cooking apparatus 700.

Display unit 630 is a display that displays the recipe or the like stored in data storage unit 620. Display unit 230 displays a specific cooking recipe information group specified based on a condition input by operation unit 240.

Operation unit 640 is means for a specific recipe being selected by a user when the plural recipes stored in data storage unit 620 are displayed as a list in display unit 630. Further, operation unit 640 may be means for performing a process of pressing a button displayed in display unit 630. In addition, operation unit 240 also functions as a condition input unit through which a condition for retrieving a specific recipe information group from the cooking recipe information groups stored in server 100 is input.

In the present embodiment, a configuration in which operation unit 640 is assembled in display unit 630 as a touch panel is shown, but a configuration in which display unit 630 and operation unit 640 are separately provided may be used.

Short distance radio communication unit 650 (second radio communication unit) refers to means for communication with cooking apparatus 700, and for example, is realized using infrared data communication, specific low-power radio, near field communication (NFC), radio tag, radio frequency identification (RFID), or the like.

Control computation unit 660 performs control for communication unit 610, data storage unit 620, display unit 630, operation unit 640, and short distance radio communication unit 650, and performs data computation for communication. Further, control computation unit 660 also performs creation of display screen data (list screens 2200, 2201, cooking method screen 2400, or the like) for screen display (to be described later) or screen transition control of display unit 630.

Next, cooking apparatus 700 includes short distance radio communication unit 710, operation control information storage unit 720, control unit 730, and apparatus information storage unit 740.

Short distance radio communication unit 710 refers to means for communication with short distance radio communication unit 650 of information terminal 1600, which is realized using a communication method corresponding to the communication method of short distance radio communication unit 650.

When the operation control information transmitted from server 500 is received by short distance radio communication unit 710 through information terminal 1600, operation control information storage unit 720 stores the operation control information.

Control unit 730 refers to means for executing the operation control based on the operation control information stored in operation control information storage unit 720, and controls an operation unit (not shown) of cooking apparatus 700. The operation unit refers to means for transmitting microwaves, for example, if cooking apparatus 700 is the microwave oven, and refers to means for heating rice if cooking apparatus 700 is the rice cooker.

Next, an operation of communication system 1900 according to the present embodiment will be described.

Figure 13:
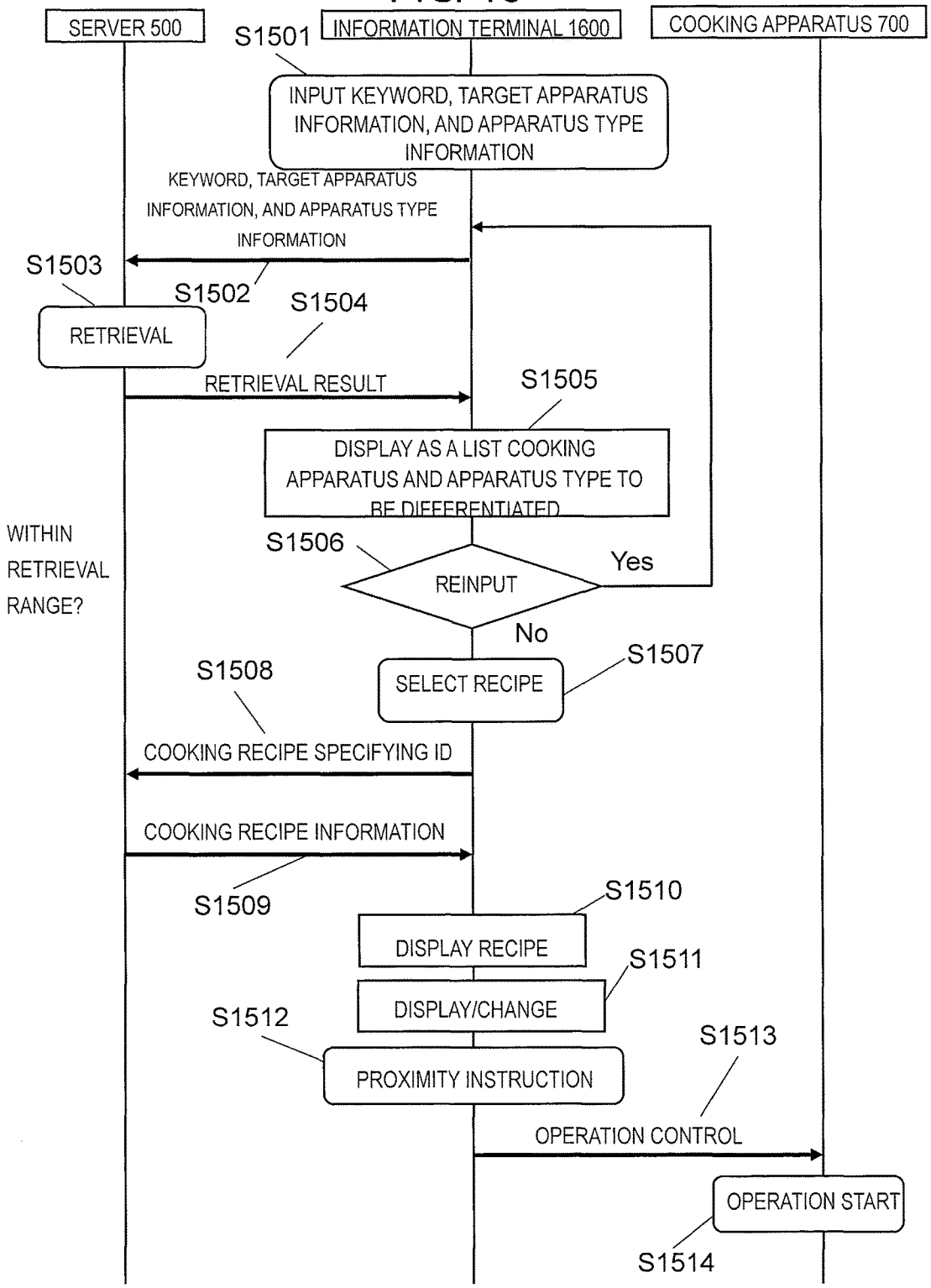
FIG. 13 is a diagram illustrating a communication sequence of the communication system according to the second exemplary embodiment of the invention.

FIG. 13 is a diagram illustrating a communication sequence of communication system 1900 according to the second exemplary embodiment of the invention.

In the following example, it is assumed that apparatus information storage unit 740 stores the target apparatus information (for example, the microwave oven), and apparatus type information (for example, A) of cooking apparatus 700.

First, a user inputs a keyword relating to a recipe to be retrieved using operation unit 640 provided in information terminal 1600 (S1501).

Here, the user inputs the target apparatus information and apparatus type information of cooking apparatus 700 owned or used by the user, in addition to the keyword.

The information may be input to information terminal 1600 by the user, before step S1501. For example, communication may be performed between information terminal 1600 and cooking apparatus 700, so that the data stored in apparatus information storage unit 740 may be obtained in data storage unit 620. Alternatively, the information may be stored in server 500 in advance.

The keyword, the target apparatus information, and the apparatus type information input through operation unit 640 are transmitted to server 500 through communication unit 610 (S1502).

Database retrieving unit 530 in server 500 that receives the keyword, the target apparatus information and the apparatus type information retrieves cooking recipe information 1000 in which a word is used that matches with the keyword from entire cooking recipe information 1000 (specifically, title information and cooking procedure information) stored in cooking recipe information database 510 (S1503).

If cooking recipe information 1000 in which the word that matches with the keyword is used is found, cooking recipe designation ID corresponding to cooking recipe information 1000, the title information and the association information are transmitted to information terminal 1600 through communication unit 520 as a retrieval result (S1504).

If communication unit 610 receives the retrieval result, control computation unit 660 differentiates the type of cooking apparatus 700 owned or used by the user from other types, with reference to the target apparatus information. In this state, control computation unit 660 generates display screen data in which the title information is displayed as a list, and displays the generated display screen data in display unit 630 (S1505).

Further, control computation unit 660 differentiates the apparatus type owned or used by the user from other types with reference to the type information. Then, control computation unit 660 generates display screen data in which the title information is displayed as a list, and displays the generated display screen data in display unit 630.

That is, display unit 630 displays as a list the specific cooking recipe information group on list screens 2200 and 2201 so that the third cooking recipe information is differentiated from the fourth cooking recipe information.

Accordingly, since the third cooking recipe information associated with the specific information for specifying the cooking apparatus and the fourth cooking recipe information that is not associated with the specific information are separately displayed, it is possible to enhance the convenience of use for the user while improving visible perceptibility to the user.

The title information of cooking apparatus 700 that is not owned or used by the user may be erased from the list of the display screen data. Further, the title information of the apparatus type that is not owned or used by the user may be erased from the list of the display screen data.

The differentiation of cooking apparatus 700 that is owned or used by the user from the other types may be performed by information terminal 1600, or may be performed by server 500 and then may be transmitted to information terminal 1600.

The user checks the retrieval results displayed as a list, and if desired title information is not present, the user re-inputs a different keyword to operation unit 640 (S1506, Yes), and database retrieving unit 530 in server 500 performs retrieval again.

On the other hand, when the user checks the retrieval result, if the desired title information is found (S1506, No), the user selects and specifies one piece of desired title information from the retrieval result using operation unit 640 (S1507).

In step S1507, if the desired title information is specified by the user, information terminal 1600 transmits cooking recipe designation ID corresponding to the specified title information to server 500 through communication unit 610 in association with the specification (S1508).

If server 500 receives cooking recipe designation ID through communication unit 520, database retrieving unit 530 reads specific cooking recipe information 1000 corresponding to cooking recipe designation ID from cooking recipe information database 510. Further, database retrieving unit 530 transmits the read information (cooking recipe specific information, title information, cooking procedure information, target apparatus information, and operation control information) to information terminal 1600 through communication unit 520 (S1509).

Information terminal 1600 receives specific cooking recipe information 1000 through communication unit 610. Further, control computation unit 660 creates display screen data from the cooking procedure information included in received specific cooking recipe information 1000, and displays the recipe as cooking method screen 2400 (S1510).

Here, when the target apparatus information and the apparatus type information are not associated with cooking recipe information 1000 that is selected and received by the user, or when the apparatus type information is different from the apparatus type of host cooking apparatus 700, the content (for example, oven heating for five minutes at 600 W) of the operation control information is displayed in information terminal 1600. Thus, it is possible to cause the user to confirm whether the content can be used in cooking apparatus 700 of the user (step S1511).

That is, when the specific cooking recipe information specified from the specific cooking recipe information group displayed on list screens 2200 and 2201 is the fourth cooking recipe information, display unit 630 displays the control information of cooking apparatus 700 corresponding to the fourth cooking recipe information.

Further, when the content of the operation control information cannot be used in cooking apparatus 700 of the user (for example, when the oven heating cannot be performed at 600 W in cooking apparatus 700 of the user), it is also possible to display a change menu (not shown) capable of changing the oven heating from 600 W to 500 W or 400 W and changing the heating time from six minutes to eight minutes, in information terminal 1600.

Further, the content display or change of the operation control information may also be performed by operating the main body of cooking apparatus 700 by the user after the operation control information is transmitted to the main body of cooking apparatus 700.

In this way, the user can display and confirm the operation control information according to the apparatus type used by the user, or change and use the operation control information.

Then, control computation unit 660 causes display unit 630 to display a message screen for instructing bringing information terminal 1600 and the specific portion of cooking apparatus 700 close to each other (S1512).

If the user views the message screen and then brings information terminal 1600 and the specific portion of cooking apparatus 700 close to each other, the operation control information of cooking recipe information 1000 specified in step S1507 is transmitted from short distance radio communication unit 650 to short distance radio communication unit 710 (S1513), and the operation control information is stored in operation control information storage unit 720.

That is, when the specific cooking recipe information specified from the specific cooking recipe information group displayed on list screens 2200 and 2201 is the third cooking recipe information, the user confirms whether cooking apparatus 700 is the cooking apparatus specified by the specific information, and then, the second radio communication unit transmits the operation control information corresponding to the third cooking recipe information to cooking apparatus 700.

Here, when transmitting or receiving the operation control information associated with the target apparatus information and the apparatus type information, and the operation control information that is not associated with the target apparatus information and the apparatus type information, information terminal 1600 or cooking apparatus 700 may generate different notifying sounds so that the user can distinguish the notifying sounds.

Further, before the operation control information is transmitted to cooking apparatus 700, the target apparatus information and the apparatus type information may be transmitted to cooking apparatus 700, and information terminal 1600 and cooking apparatus 700 may confirm whether the operation control information matches with the target apparatus information and the apparatus type information of received cooking apparatus 700.

When the operation control information does not match with the target apparatus information and the apparatus type information, the operation control information is not notified to the user instead of being transmitted to the cooking apparatus. Accordingly, for example, when cooking apparatus 700 that is brought close to information terminal 1600 by the user is wrong (for example, when the user has plural microwave ovens and has a wrong choice, or when the rice cooker is brought close to information terminal 1600 even though the operation control information of the microwave oven is selected), it is possible to notify the user of such a fact without performing the cooking.

Further, control unit 730 controls the operation unit to perform the operation control based on the operation control information stored in operation control information storage unit 720 (S1514).

Next, the screen displayed by display unit 630 will be described.

Figure 14:
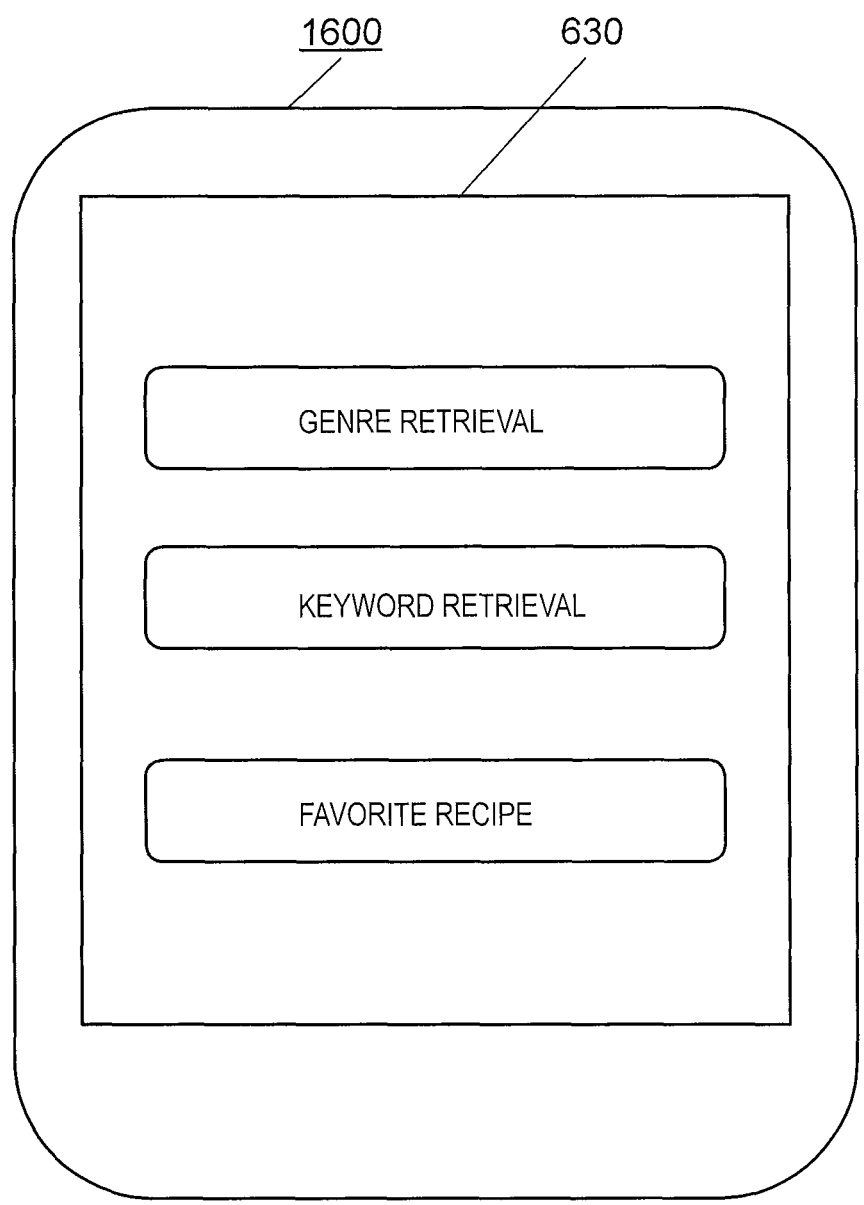
FIG. 14 is a diagram illustrating a screen for a recipe retrieving method displayed by a display unit being selected by a user in the information terminal of the second exemplary embodiment of the invention.

FIG. 14 is a diagram illustrating a screen for the recipe retrieving method displayed by display unit 630 selected by the user in information terminal 1600 of the second exemplary embodiment of the invention.

When performing the keyboard input shown in step S1501, the user selects an input method based on the screen shown in FIG. 14.

In the present embodiment, an example in which the user selects a middle button, that is, keyword retrieval to perform retrieval is described, but the invention is not limited thereto. The user may perform the recipe retrieval using another method ("genre retrieval" or "favorite recipes") displayed in FIG. 14, or the like.

The "genre retrieval" refers to a method for selecting a classification that the user desires from target cooking classifications (vegetable, meat, fish or the like) to retrieve the recipe. Further, the "favorite recipes" refer to a method for displaying as a list recipes selected by the user for a predetermined time, for example, for the last one month for selection by the user.

If the "keyword retrieval" on the display screen in FIG. 14 is pressed, a keyword input section is displayed, so that the user inputs a keyword relating to a desired recipe.

Figure 15B:
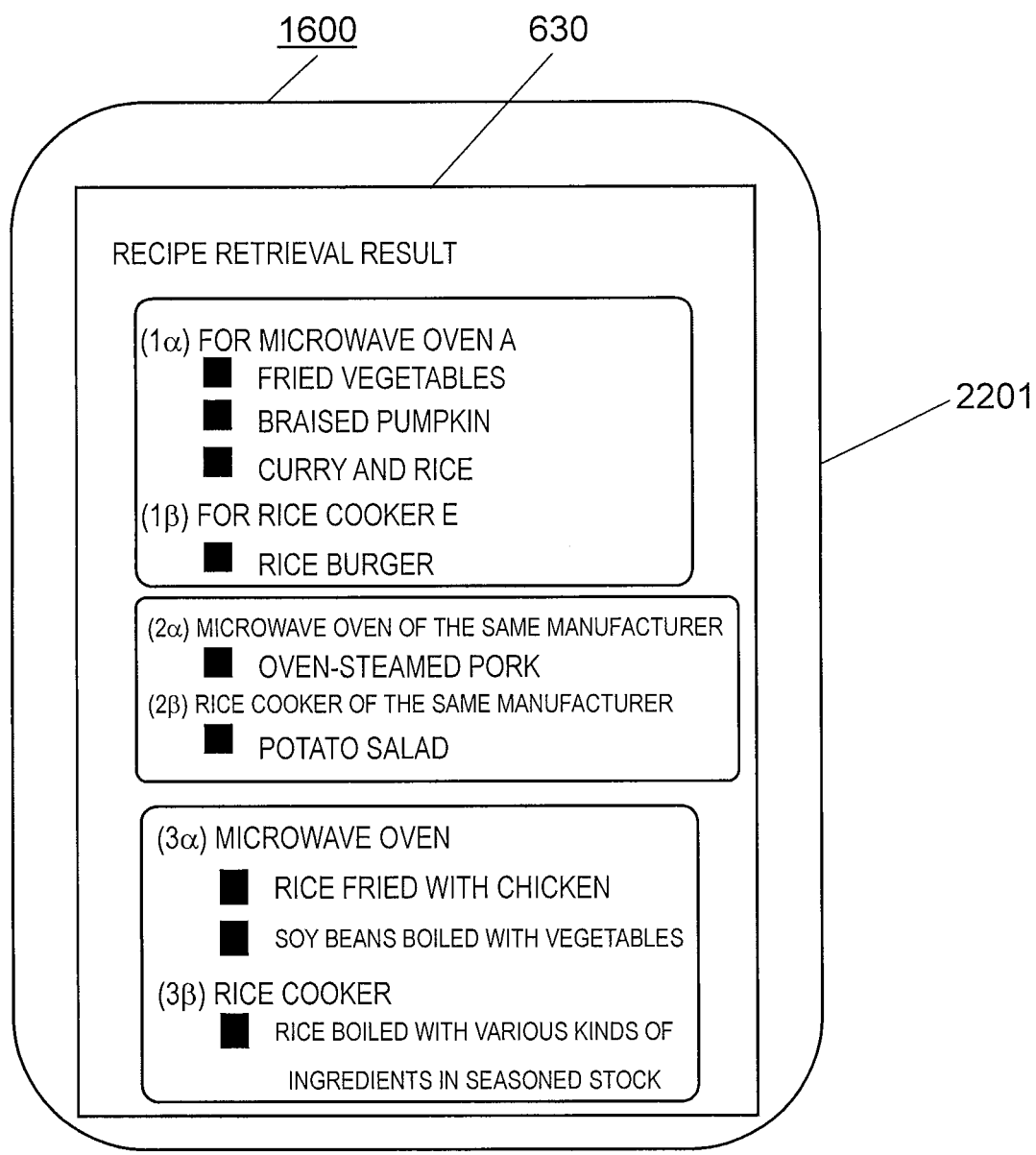
FIG. 15B is a diagram illustrating another example of the display screen created by the control computation unit that receives the retrieval result after the user inputs the keyword, in the second exemplary embodiment of the invention.

FIGS. 15A and 15B are diagrams illustrating display screens created by control computation unit 660 that receives the retrieval result after the user inputs the keyword, in the second exemplary embodiment of the invention. These display screens correspond to list screens 2200 and 2201 displayed in step S1505 in FIG. 13.

Here, it is assumed that the user owns a microwave oven of apparatus type information A.

In an example shown in FIG. 15A, recipes (specific cooking recipe information group) that are the retrieval results are divided into three types of recipes in display unit 630, as list screen 2200, as follows so that the recipes are differentiated at a glance. The three types of recipes include (1) a cooking recipe in which the target apparatus information is the microwave oven and the apparatus type information is A (the third cooking recipe information), (2) a cooking recipe in which the target apparatus information is the microwave oven and the apparatus type information is not A (the third cooking recipe information), and (3) a cooking recipe other than (1) and (2) (the fourth cooking recipe information).

When retrieving a recipe from the recipes for the microwave oven owned by the user, the user views a retrieval result of the recipe in which the target apparatus information is the microwave oven and the apparatus type information is A as in (1) of FIG. 15A.

Slightly widening the retrieval result, when retrieving a recipe from recipes for a microwave oven of a different apparatus type that is not the microwave oven owned by the user, the user views a retrieval result of the cooking recipe in which the target apparatus information is the microwave oven and the apparatus type information is not A as in (2) of FIG. 15A.

Further widening the retrieval result, when any cooking recipe can be selected as long as the cooking recipe is a cooking recipe for the microwave oven, the user views a retrieval result of the cooking recipe as in (3) in FIG. 15A.

In the display of the retrieval result of the cooking recipe in which the target apparatus information is the microwave oven and the apparatus type is not A as in (2) of FIG. 15A, when the recipe is not for the microwave oven owned by the user, for example, the user may set a condition such that the retrieval result is narrowed, for display, to a microwave oven of the same manufacturer as that of the microwave oven owned by the user, or to a microwave oven of an apparatus type that is lower in level than the microwave oven owned by the user, with reference to the target apparatus information and the apparatus type information.

Here, in information terminal 1600 of the present embodiment, similarly, the specific cooking recipe information group is divided into the first cooking recipe information associated with the operation control information and the second cooking recipe information that is not associated with the operation control information to be displayed in display unit 630.

Further, instead of FIG. 15A, as in list screen 2201 of FIG. 15B, cooking apparatus 700 may include all cooking apparatuses 700 owned or used by the user as a target, in addition to the microwave oven. Here, recipes (1α, 2α and 3α) of the microwave oven owned by the user and recipes (1β, 2β and 3β) of the rice cooker are displayed. On list screen 2201, similarly, the third cooking recipe information and the fourth cooking recipe information are displayed to be differentiated from each other.

Figure 16:
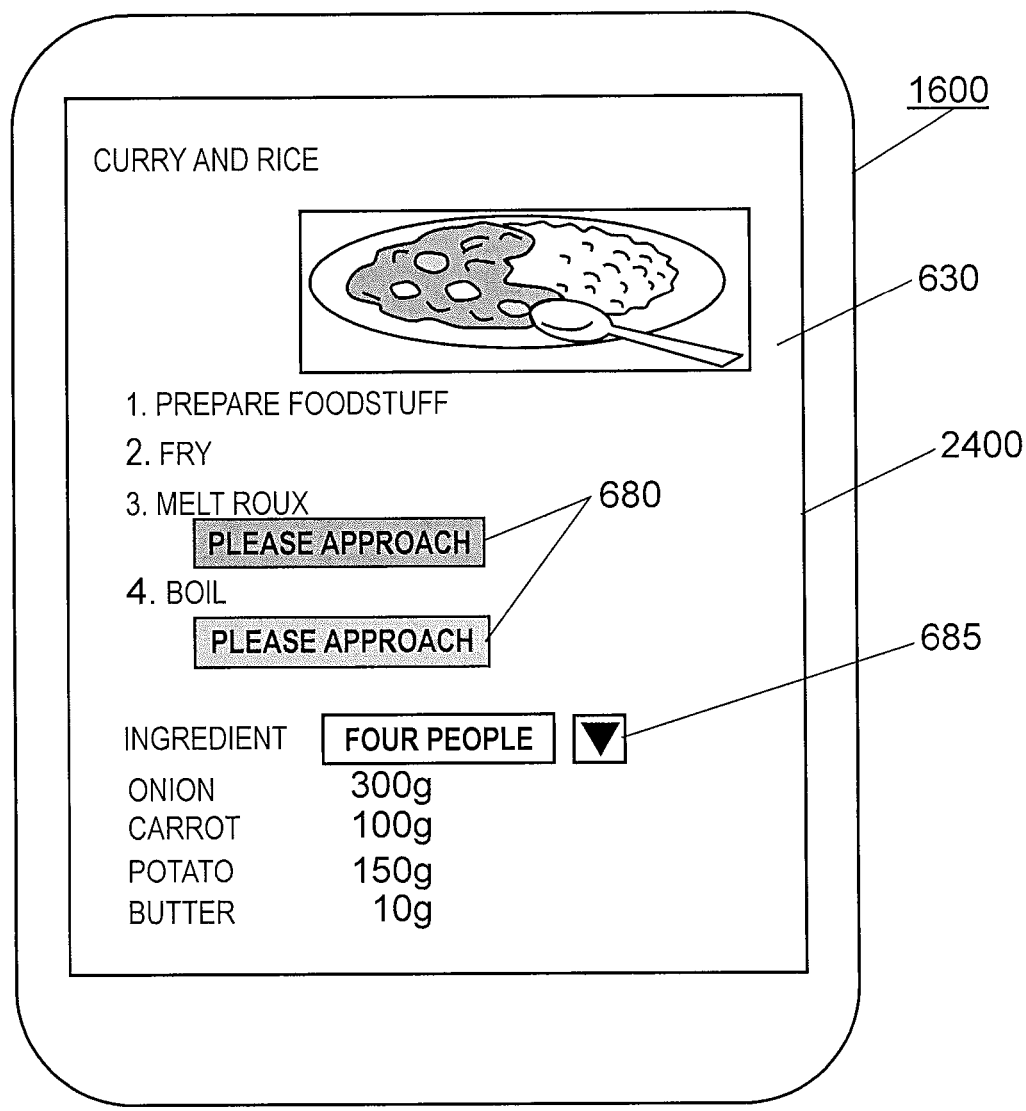
FIG. 16 is a diagram illustrating an example of a cooking method screen displayed when the user selects a recipe, in the second exemplary embodiment of the invention.

FIG. 16 is a diagram illustrating an example of cooking method screen 2400 displayed when the user selects a recipe, in the second exemplary embodiment of the invention. The display screen corresponds to the recipe display displayed in step S1510 in FIG. 13.

FIG. 16 shows cooking method screen 2400 displayed when the "curry and rice" displayed as a menu having the operation control information on list screens 2200 and 2201 shown in FIGS. 5A and 5B is selected by operation unit 640.

Information in FIG. 16 is generated from the cooking procedure information by control computation unit 660. As a method for cooking the curry and rice, a procedure of (1) preparing foodstuff, (2) frying the foodstuff, (3) pouring curry roux and water into a pot and heating the mixture by cooking apparatus 700 to melt the roux, and (4) pouring the foodstuff into the pot where the curry roux is melted and heating the mixture by cooking apparatus 700 is shown.

That is, display unit 630 displays cooking method screen 2400 that shows a cooking method relating to the specific cooking recipe information in the specific cooking recipe information groups displayed on list screens 2200 and 2201.

In (3) and (4) of the cooking procedure, the heating operation using cooking apparatus 700 is necessary, and thus, it is necessary to transmit optimal setting information according to the recipe to cooking apparatus 700.

On the other hand, on the cooking method screen shown in FIG. 16, on a lower side of each of (3) and (4) of the cooking procedure, proximity instruction mark 680 for requesting that the user brings information terminal 1600 and the specific portion of cooking apparatus 700 close to each other is shown.

Thus, it is possible to guide the user in a time series manner, and thus, it is also possible to enhance the convenience of use for the user. The close portion may be an operation portion of cooking apparatus 700, or may be the vicinity of short distance radio communication unit 710 or the vicinity of the position of an antenna may be used.

That is, display unit 630 displays the cooking method with the lapse of time, and displays a button for instructing transmission of the operation control information to cooking apparatus 700 through the second radio communication unit, in a time series manner at a position where the operation control information is necessary, on cooking method screen 2400.

Thus, it is possible to guide the user in a time series manner, and thus, it is possible to further enhance the convenience of use for the user.

Further, on a lower side of cooking method screen 2400, user number change setting mark 685 is also displayed, so that the user can press user number change setting mark 685 to change the number of users.

Figure 17:
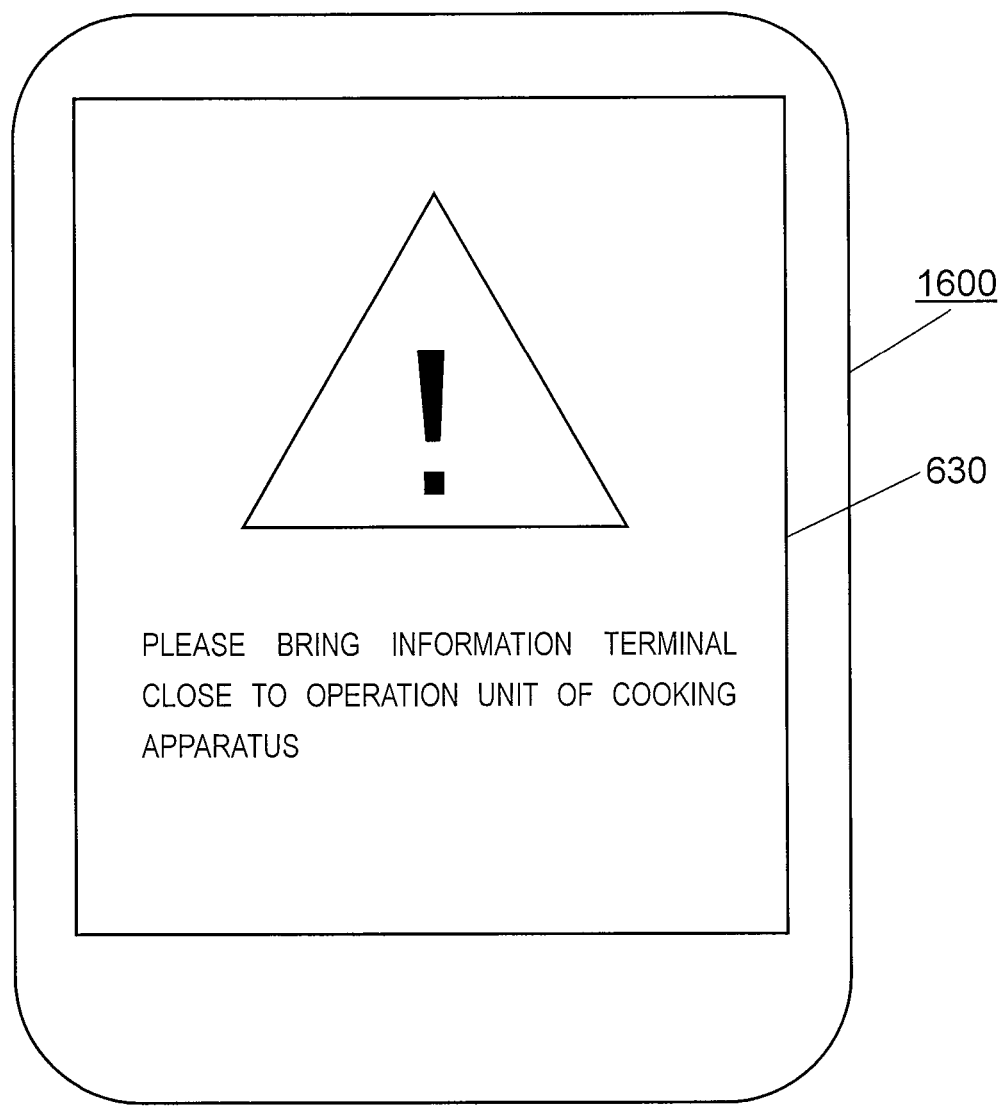
FIG. 17 is a diagram illustrating an example of a screen for requesting that the user brings the information terminal and the cooking apparatus close to each other, in the second exemplary embodiment of the invention.

If the user presses proximity instruction mark 680 of (3) or (4) of the cooking procedure, a screen for requesting that the user brings information terminal 1600 and the specific portion of cooking apparatus 700 close to each other is displayed as shown in FIG. 17.

FIG. 17 is a diagram illustrating an example of the screen for requesting that the user brings information terminal 1600 and the specific portion of cooking apparatus 700 close to each other, in the second exemplary embodiment of the invention. The display screen corresponds to the proximity instruction display displayed in step S1512 in FIG. 13.

The user brings information terminal 1600 close to the specific portion of cooking apparatus 700. Then, the operation control information that is setting information that is appropriately determined in advance is transmitted to short distance radio communication unit 710 from short distance radio communication unit 650, in (3) or (4) of the cooking procedure. The operation control information received in short distance radio communication unit 710 is stored in operation control information storage unit 720. Then, control unit 730 controls the operation unit to perform the operation control based on the operation control information.

That is, when the specified recipe displayed on cooking method screen 2400 of display unit 630 is the first cooking recipe associated with the operation control information, short distance radio communication unit 650 (second radio communication unit) transmits the operation control information corresponding to the first cooking recipe to cooking apparatus 700.

Accordingly, it is not necessary for the user to manually perform complicated cooking setting, and it is possible to simply set optimal operation control information to cooking apparatus 700.

Further, with a configuration in which short distance radio communication unit 650 (second radio communication unit) performs short distance radio communication, the user transmits the operation control information to cooking apparatus 700 in the vicinity of cooking apparatus 700. Thus, even when malfunction occurs in cooking apparatus 700, it is possible to rapidly handle the malfunction, and to prevent a fire, dry heating, contamination of inappropriate foodstuff, or the like.

As an example of proximity instruction mark 680, in FIGS. 16 and 17, a message "please approach (to the cooking apparatus)" is displayed, but the invention is not limited thereto. For example, a message indicating transmission of the operation control information may be used.

Proximity instruction mark 680 in FIG. 16 may employ a configuration in which a display color or a display type is changed according to whether proximity instruction mark 680 is pressed. Accordingly, it is possible for the user to recognize the cooking step up to now, and to prevent a mistake of pressing same proximity instruction mark 680 again. Further, it is possible to prevent proximity instruction mark 680 from being pressed twice by the user, and thus, it is possible to further enhance the convenience of use for the user.

For example, in FIG. 16, proximity instruction mark 680 corresponding to (3) of the cooking procedure is displayed by a dark color as the button that is already pressed, and proximity instruction mark 680 corresponding to (4) of the cooking procedure is displayed by a light color as the button that is not yet pressed. Further, the color of the mark may be changed before and after the pressing, or instead, the pressed short distance instruction mark may be erased from the screen display.

Further, user number change setting mark 685 in FIG. 16 refers to a mark capable of changing the number of users as the user presses the mark.

Figure 18:
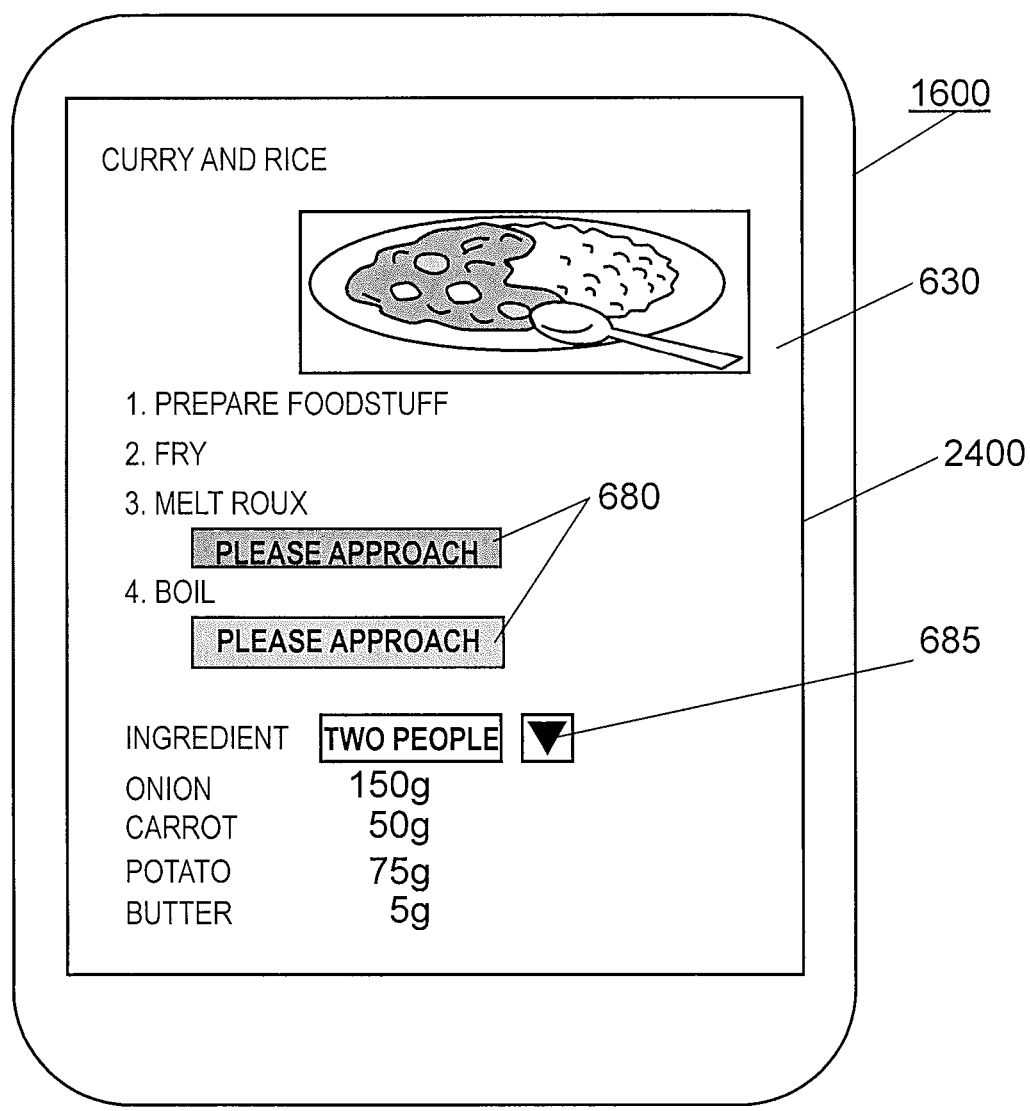
FIG. 18 is a diagram illustrating an example of a cooking method screen displayed when the user selects a recipe, in the second exemplary embodiment of the invention.

FIG. 18 is a diagram illustrating an example of cooking method screen 2400 displayed when the user selects the recipe in the second exemplary embodiment of the invention.

FIG. 18 shows a screen displayed when the number of users set to four in FIG. 16 is changed to two. By decreasing the number of users to the half, the amount of the foodstuff displayed is decreased to the half compared with the example shown in FIG. 16. Further, in FIG. 18, when proximity instruction mark 680 is pressed, the operation control information (for example, a half the heating cooking time) suitable for heating and cooking the foodstuff that is the half compared with FIG. 16 is transmitted to cooking apparatus 700.

Thus, it is possible to simply create the operation control information based on the number of the family of the user, and thus, it is possible to further enhance the convenience of use for the user.

In order to realize this function, when the number of users is changed using user number change setting mark 685, information terminal 1600 sends an inquiry to server 500, and then, server 500 retrieves the operation control information suitable for the half material from cooking recipe information database 510 and transmits the result to information terminal 1600. Further, after the number of users is changed using user number change setting mark 685, information terminal 1600 may send an inquiry to server 500 when proximity instruction mark 680 is pressed, to obtain the operation control information suitable for the material corresponding to the number of users.

An example is described in which, in step S1508 described in FIG. 13, server 500 receives cooking recipe designation ID through communication unit 520 and reads the detailed data on the recipe and the cooking recipe information relating to the specified recipe from cooking recipe information database 510, and in step S1509, read cooking recipe information 1000 is transmitted to information terminal 1600 through communication unit 520. However, the invention is not limited the example.

For example, an example may be used in which if cooking apparatus 700 includes a communication unit capable of performing communication with server 500, cooking recipe designation ID is transmitted from information terminal 1600 to server 500, and then, the operation control information is directly transmitted from server 500 to cooking apparatus 700.

FIG. 19 is a diagram illustrating another example of information stored in cooking recipe information database 510, in the second exemplary embodiment of the invention.

In cooking recipe information database 510 shown in FIG. 12, cooking recipe information 1000 that includes the operation control information and cooking recipe information 1000 that does not include the operation control information are mixed, but as shown in FIG. 19, a first database, a second database, and a third database are separately provided for management. The first database stores cooking recipe information 1000 that includes the target apparatus information and the apparatus type information in which the target apparatus information is the "microwave oven". The second database stores cooking recipe information 1000 that includes the target apparatus information and the apparatus type information in which the target apparatus information is the "rice cooker". The third database stores cooking recipe information 1000 that includes the target apparatus information but does not include the apparatus type information.

When cooking recipe information 1000 is managed in the different servers, for example, the cooking program that includes the target apparatus information and the apparatus type information may be usually prepared by a manufacturer of the cooking apparatus.

In the configuration of FIG. 19, since each manufacturer individually manages the databases, it is possible to reduce the burden of the manufacturer. Further, since the manufacturer manages the databases of the cooking apparatus made by the manufacturer, it is possible to enhance the reliability for the cooking recipe.

Further, the databases of server 500 may be separately provided for management of cooking recipe information 1000 that includes the target apparatus information and the apparatus type information and cooking recipe information 1000 that does not include the target apparatus information and the apparatus type information. In this case, in step S1504 in FIG. 13, server 500 can individually transmit cooking recipe designation ID and the title information about cooking recipe information 1000 that includes the target apparatus information and the apparatus type information and cooking recipe designation ID and the title information about cooking recipe information 1000 that does not include the target apparatus information and the apparatus type information, and thus, it is not necessary to perform a process of separating cooking recipe information 1000 that includes the target apparatus information and cooking recipe information 1000 that does not include the target apparatus information and the apparatus type information, in control computation unit 660 that receives cooking recipe information 1000.

Since the communication between information terminal 1600 and cooking apparatus 700 is the short distance radio communication, the user transmits the operation control information to cooking apparatus 700 in the vicinity of cooking apparatus 700. Accordingly, even though the malfunction of cooking apparatus 700 occurs, it is possible to immediately handle the problem, or to prevent dry heating, contamination of inappropriate foodstuff, or the like.

The communication between information terminal 1600 and cooking apparatus 700 is not limited to the short distance radio communication. For example, when the communication is radio communication or wired communication, it is possible to obtain the same effect by using a design in which a cooking start operation of starting the operation of cooking apparatus 700 is not performed in information terminal 1600 but is performed in the main body of cooking apparatus 700 (for example, a "cooking start button" of the main body of cooking apparatus 700 is pressed).

In the above-described embodiments, the function of each block may be written in a computer program, which may be executed by a computer.

Further, a configuration in which a part of the processes performed by control computation unit 660 of information terminal 1600 is processed in server 500 may be used.

INDUSTRIAL APPLICABILITY

As described above, according to the invention, it is possible to enhance the convenience of use for the user while improving the visual perceptibility to the user. Thus, the invention is useful for an information terminal, and particularly, an information terminal that receives a recipe or a cooking program supplied from a server and transmits the recipe or the cooking program to the cooking apparatus, a method for controlling the information terminal, a control program of the information terminal, and the like.

The invention claimed is:

1. A method for providing a cooking recipe, comprising:
    receiving a plurality of cooking recipe information pieces for performing cooking using a cooking apparatus;
    determining from among the plurality of cooking recipe information pieces a first set of cooking recipe information pieces that include operation control information for controlling an operation of the cooking apparatus and a second set of cooking recipe information pieces that do not include operation control information for controlling an operation of the cooking apparatus;
    generating first display screen data for separately displaying the first set of cooking recipe information pieces and the second set of cooking recipe information pieces;
    displaying a first interface based on the first display screen data including separately displaying the first set of cooking recipe information pieces and the second set of cooking recipe information pieces;
    receiving via the first interface an input for designating a cooking recipe information piece designated from among the first set of cooking recipe information pieces and the second set of cooking recipe information pieces; and
    generating second display screen data for displaying a cooking method relating to the designated cooking recipe information.

2. The method for providing a cooking recipe of claim 1, further comprising:
    displaying a second interface that receives an input of a retrieval condition for retrieving specific cooking recipe information,
    wherein the plurality of cooking recipe information pieces for performing the cooking using the cooking apparatus are specified based on the input retrieval condition.

3. The method for providing a cooking recipe of claim 1, wherein
    the first set of cooking recipe information pieces is stored in a first database, and the second set of cooking recipe information pieces is stored in a second database.

4. The method for providing a cooking recipe of claim 1, further comprising:
    transmitting, when the designated cooking recipe information is designated from among the first set of cooking recipe information pieces, the operation control information corresponding to the first set of cooking recipe information pieces to the cooking apparatus.

5. The method for providing a cooking recipe of claim 4, wherein
    the second display screen data is display screen data for displaying the cooking method with an order of a lapse of time and for displaying downloading of the operation control information or transmission of the operation control information to the cooking apparatus, in a time series manner at a position where the operation control information is necessary.

6. The method for providing a cooking recipe of claim 5, wherein
    the second display screen data is display information for instructing the transmission of the operation control information to the cooking apparatus by displaying a button so that the button that is already pressed and the button that is not pressed are differentiated from each other.

7. The method for providing a cooking recipe of claim 6, wherein
    in the transmitting of the operation control information, the operation control information is transmitted to the cooking apparatus using short distance radio communication.

8. The method for providing a cooking recipe of claim 4, wherein
    in the transmitting of the operation control information, the operation control information is transmitted to the cooking apparatus using short distance radio communication.

9. The method for providing a cooking recipe of claim 5, wherein
    in the transmitting of the operation control information, the operation control information is transmitted to the cooking apparatus using short distance radio communication.

10. A non-transitory computer-readable storage medium storing a computer program that is executed in an information terminal that performs communication with a server that stores cooking recipe information for performing cooking using a cooking apparatus, the computer program causing a computer to execute a procedure comprising:
    receiving the cooking recipe information from the server, including first cooking recipe information that is associated with operation control information for controlling an operation of the cooking apparatus and second cooking recipe information that is not associated with the operation control information;
    displaying the received cooking recipe information so that the first cooking recipe information that is associated with operation control information for controlling an operation of the cooking apparatus and the second cooking recipe information that is not associated with the operation control information are displayed separately so as to differentiated from each other;
    providing an interface that receives an input for designating desired cooking recipe information designated from the displayed cooking recipe information; and
    displaying a cooking method relating to the designated cooking recipe information.

11. An information terminal comprising:
    a communication unit that performs communication with a server to receive cooking recipe information for performing cooking using cooking apparatus from the server;
    a display unit;
    a controller programmed to cause the display unit to display a first screen on which the cooking recipe information received from the server is displayed so that first cooking recipe information that is associated with operation control information for controlling an operation of the cooking apparatus and second cooking recipe information that is not associated with the operation control information are display separately so as to be differentiated from each other; and
    a designation unit that receives an input for designating desired cooking recipe information designated from the displayed cooking recipe information, the controller further programmed to cause the display unit to display a second screen on which a cooking method relating to the designated cooking recipe information is displayed.

* * * * *